United States Patent
Tamaki et al.

(10) Patent No.: US 9,188,376 B2
(45) Date of Patent: Nov. 17, 2015

(54) REFRIGERANT CHARGE ASSISTING DEVICE, AIR-CONDITIONING APPARATUS, AND REFRIGERANT CHARGE ASSISTING PROGRAM

(71) Applicant: Mitsubishi Electric Corporation, Chiyoda-ku, Tokyo (JP)

(72) Inventors: Shogo Tamaki, Tokyo (JP); Fumitake Unezaki, Tokyo (JP); Kazuyoshi Shinozaki, Cypress, CA (US); Tomohiko Kasai, Cypress, CA (US)

(73) Assignee: Mitsubishi Electric Corporation, Tokyo (JP)

( * ) Notice: Subject to any disclaimer, the term of this patent is extended or adjusted under 35 U.S.C. 154(b) by 355 days.

(21) Appl. No.: 13/721,275

(22) Filed: Dec. 20, 2012

(65) Prior Publication Data

US 2014/0174114 A1    Jun. 26, 2014

(51) Int. Cl.
- F25B 45/00 (2006.01)
- F25B 13/00 (2006.01)
- F25B 49/02 (2006.01)

(52) U.S. Cl.
CPC ............... *F25B 45/00* (2013.01); *F25B 13/00* (2013.01); *F25B 49/022* (2013.01); *F25B 2313/006* (2013.01); *F25B 2313/0231* (2013.01); *F25B 2313/0233* (2013.01);
(Continued)

(58) Field of Classification Search
CPC ............... F25B 45/00; F25B 2345/00; F25B 2345/001; F25B 2345/003; F25B 2600/05; F25B 2700/04

USPC ..................... 62/77, 149, 174, 292
See application file for complete search history.

(56) References Cited

U.S. PATENT DOCUMENTS

| | | | |
|---|---|---|---|
| 8,806,877 B2 * | 8/2014 | Tamaki et al. | 62/149 |
| 2011/0308267 A1 | 12/2011 | Tamaki et al. | |
| 2012/0318011 A1 * | 12/2012 | Ochiai et al. | 62/127 |

FOREIGN PATENT DOCUMENTS

| | | |
|---|---|---|
| EP | 2 034 261 A1 | 3/2009 |
| JP | 2007-163102 A | 6/2007 |

(Continued)

OTHER PUBLICATIONS

International Search Report and Written Opinion mailed on Jul. 24, 2014 for corresponding International Patent Application No. PCT/IB2014/000175 (in English).

*Primary Examiner* — Marc Norman
(74) *Attorney, Agent, or Firm* — Posz Law Group, PLC

(57) ABSTRACT

Operation data of a refrigerant circuit is acquired after an initial refrigerant charge amount of refrigerant is charged in the refrigerant circuit and operation of the refrigerant circuit is started, an internal volume of a high-pressure pipe 6 is computed from the obtained operation data and the initial refrigerant charge amount input in a input unit 112, a target refrigerant charge amount is computed from the computed internal volume of the high-pressure pipe 6 and a standard operating state acquired in advance, the standard operating state being operation data of the refrigerant circuit when the refrigerant circuit is in a standard operating state that satisfies a preset condition, and an additional refrigerant charge amount is computed from the target refrigerant charge amount and the initial refrigerant charge amount.

14 Claims, 6 Drawing Sheets

(52) U.S. Cl.
CPC .......... *F25B 2313/02741* (2013.01); *F25B 2313/0311* (2013.01); *F25B 2313/0314* (2013.01); *F25B 2313/0315* (2013.01); *F25B 2345/001* (2013.01); *F25B 2345/003* (2013.01); *F25B 2400/13* (2013.01); *F25B 2500/19* (2013.01); *F25B 2500/23* (2013.01); *F25B 2500/24* (2013.01); *F25B 2600/0253* (2013.01); *F25B 2600/05* (2013.01); *F25B 2700/1931* (2013.01); *F25B 2700/1933* (2013.01); *F25B 2700/2103* (2013.01); *F25B 2700/2104* (2013.01); *F25B 2700/2106* (2013.01); *F25B 2700/21152* (2013.01); *Y02B 30/741* (2013.01)

(56) References Cited

FOREIGN PATENT DOCUMENTS

| | | |
|---|---|---|
| JP | 2010-133636 A | 6/2010 |
| JP | 2011-089717 A | 5/2011 |

* cited by examiner

REFRIGERANT CHARGE ASSISTING DEVICE, AIR-CONDITIONING APPARATUS, AND REFRIGERANT CHARGE ASSISTING PROGRAM

TECHNICAL FIELD

The present disclosure relates to a refrigerant charge assisting device, an air-conditioning apparatus, and a refrigerant charge assisting program.

BACKGROUND ART

In an air-conditioning apparatus established by connecting a plurality of use units to at least one heat source unit via refrigerant extension pipes, a refrigerant is charged at the time of installation work of the units with the amount according to the length of the refrigerant extension pipes at the installation site. Here, if the charged refrigerant amount is not adequate, a flaw in the operating state of the air-conditioning apparatus will occur. If there is an overcharge, for example, the pressure in the refrigeration cycle apparatus during operation of the device will be high; hence, the device will be forced to be stopped due to safety reasons and will fall into a situation not allowing its operation to be performed. Conversely, if the charged refrigerant amount is insufficient, the intended cooling capacity and the heating capacity cannot be obtained. Accordingly, technological development for charging adequate amount of refrigerant in the air-conditioning apparatus has been conventionally made (see, Patent Literature 1, for example).

In the air-conditioning apparatus described in Patent Literature 1, the optimum refrigerant amount as a target charging value for the heat source unit and the use units are obtained in advance through experiments and simulations. Further, an automatic refrigerant charge operation is carried out such that refrigerant charging is carried out until the total value of the refrigerant amount in the heat source unit and the refrigerant amount in the use units, which are computed from the refrigerant flowing in the refrigerant circuit or the operation state quantity of the components, reach the target charging value. With this method, it will be possible to carry out automatic charging of the refrigerant even if the pipe length of the refrigerant communication pipe is unknown, since it only requires computation of the refrigerant amount of only the heat source unit and the use units.

Further, as a technique for calculating the refrigerant amount in the air-conditioning apparatus, there is one described in Patent Literature 2. In Patent Literature 2, a method is disclosed in which an internal volume of a refrigerant extension pipe is computed from operation data and an initial charge amount so as to compute the refrigerant amount, regardless of the difference in the pipe length of the refrigerant extension pipe that corresponds with the installation condition at the installation site. Further, in Patent Literature 2, a method is disclosed in which the internal volume of the refrigerant extension pipe is computed using two or more different sets of operation data such as operation data of different liquid refrigerant extension pipe temperatures when the initial charging amount is unknown.

CITATION LIST

Patent Literature

Patent Literature 1: Japanese Unexamined Patent Application Publication No. 2007-163102 (FIG. 4)

Patent Literature 2: Japanese Unexamined Patent Application Publication No. 2010-133636 (FIG. 4)

SUMMARY OF INVENTION

Problem to be Solved by the Invention

However, in Patent Literature 1, since the pipe length of the refrigerant communication pipe is unknown, the worker cannot grasp the remaining amount of the refrigerant charge amount relative to the target amount when manually charging the refrigerant from a refrigerant cylinder. Accordingly, the worker charges the refrigerant in small amounts in order to avoid overcharging; hence, the time required for the charging work is extremely long.

Further, in Patent Literature 2, since the internal volume of the refrigerant extension pipe can be computed, it is possible to compute the current charged amount of refrigerant. However, since Patent Literature 2 is a technique aiming to detect refrigerant leakage, facilitation of charging work when charging adequate amount of refrigerant in the air-conditioning apparatus is not taken into consideration.

The present disclosure is addressed to solve the above problems and an object thereof is to obtain a refrigerant charge assisting device, an air-conditioning apparatus, and a refrigerant charge assisting program capable of facilitating performance of refrigerant charging work by displaying an additional refrigerant charge amount that is required in order to achieve an adequate operating state when refrigerant is charged in the refrigerant circuit.

Means for Solving the Problem

A refrigerant charge assisting device according to the present disclosure is used when a refrigerant is charged into a refrigerant circuit of an air-conditioning apparatus in which the refrigerant circuit is formed by one or more heat source units including a compressor and a heat source side heat exchanger and one or more use units including a use side pressure reduction mechanism and a use side heat exchanger that are connected with a liquid side refrigerant extension pipe and a gas side refrigerant extension pipe, the refrigerant charge assisting device. The refrigerant charge assisting device includes an input unit that is input with an initial refrigerant charge amount; an operation data acquisition unit that starts operation of the refrigerant circuit after the initial refrigerant charge amount of refrigerant is charged in the refrigerant circuit, the operation data acquisition unit acquiring operation data of the refrigerant circuit; a charge amount computing unit that computes an internal volume of the liquid side refrigerant extension pipe from the initial refrigerant charge amount input to the input unit and the operation data acquired by the operation data acquisition unit, a target refrigerant charge amount from the internal volume of the liquid side refrigerant extension pipe and a standard operating state acquired in advance, the standard operating state being operation data of the refrigerant circuit when the refrigerant circuit is in a standard operating state that satisfies a preset condition, and an additional refrigerant charge amount on a basis of the target refrigerant charge amount and the initial refrigerant charge amount; and a display unit that displays the additional refrigerant charge amount that is computed by the charge amount computing unit.

Effects of Invention

In the present disclosure, since the required additional charge amount for obtaining an appropriate operating state is displayed, it is possible to easily carry out refrigerant charging work.

MODES FOR CARRYING OUT THE INVENTION

First Exemplary Embodiment

Configuration of Components

The configuration of a refrigerant charge assisting device and an air-conditioning apparatus of the first exemplary embodiment of the present disclosure will be described with reference to the accompanying drawings. Note that, in this description, the unit of the symbols used in the equations will be stated inside square brackets [ ]. Further, when dimensionless (no unit), it is denoted as [-].

Figure 1:
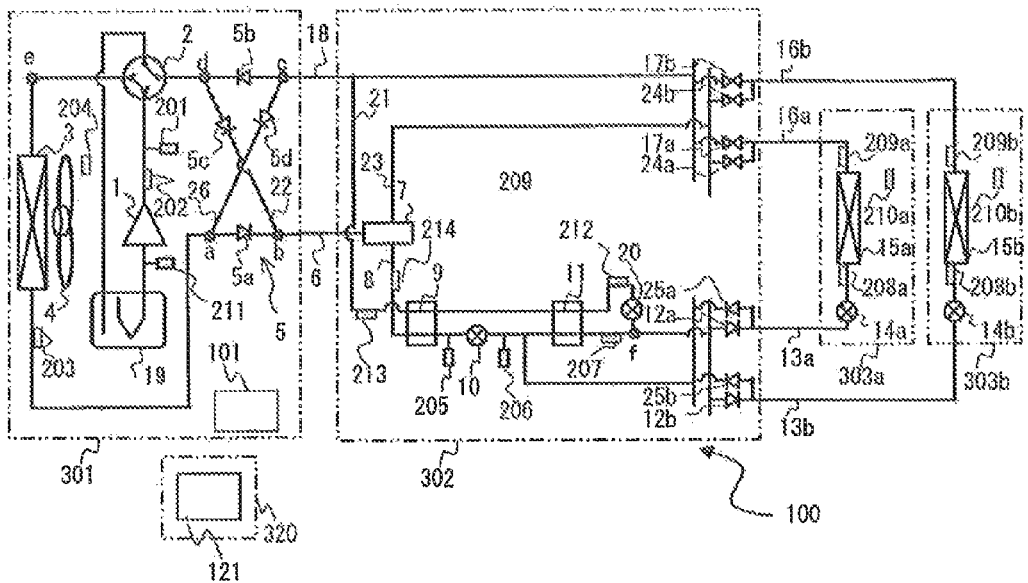
FIG. 1 is a refrigerant circuit diagram of an air-conditioning apparatus 100 into which a refrigerant is charged using a refrigerant charge assisting device 121 according to the first exemplary embodiment of the present disclosure.

FIG. 1 is a refrigerant circuit diagram of an air-conditioning apparatus 100 into which a refrigerant is charged using a refrigerant charge assisting device 121 according to the first exemplary embodiment of the present disclosure. This air-conditioning apparatus 100 is installed in office buildings, apartments, and commercial facilities. The air-conditioning apparatus 100 is an apparatus that performs a refrigeration cycle operation by vapor compression in which a refrigerant for air conditioning is circulated. By performing a refrigeration cycle operation, the air-conditioning apparatus 100 is capable of individually processing a selected cooling command (cooling ON/OFF) or a selected heating command (heating ON/OFF) to perform simultaneous cooling and heating in each of use units 303a and 303b.

The air-conditioning apparatus 100 includes a heat source unit 301, a relay unit 302, and the use units 303a and 303b. In the air-conditioning apparatus 100, the heat source unit 301 and the relay unit 302 are connected by a high-pressure pipe 6 that is a liquid-side refrigerant extension pipe and a low-pressure pipe 18 that is a gas-side refrigerant extension pipe. The relay unit 302 and each of the use units 303a and 303b are connected by indoor liquid branch pipes 13a and 13b, respectively, that are liquid side refrigerant extending branch pipes and by indoor gas branch pipes 16a and 16b, respectively, that are gas-side refrigerant extending branch pipes. The refrigerant used in the air-conditioning apparatus 100 may be R410A, R32, HFO-1234yf, or a natural refrigerant such as hydrocarbon, for example.

<Heat Source Unit 301>

The heat source unit 301 includes a compressor 1, a four-way valve 2, a heat source side heat exchanger 3, a heat source side fan 4, a block-of-check-valves 5, an accumulator 19, and pipes 22 and 26. The compressor 1 suctions and compresses a refrigerant into a high-temperature high-pressure state and includes one whose rotation speed is controlled by an inverter. Herein, the high- or low-pressure is not determined in relation to a reference pressure (value) and is described on the basis of relative highness or lowness in the refrigerant circuit that is caused by compression of the compressor and by control of the opened/closed state (opening degree) of the pressure reduction mechanism described later. Note that the same applies to the highs or lows of temperature. Basically, the pressure of the refrigerant discharged from the compressor 1 is the highest, and, since this pressure is reduced by the pressure reduction mechanism and the like, the pressure of the refrigerant suctioned into the compressor 1 is the lowest.

The four-way valve 2 is a valve that switches the flow direction of the refrigerant and includes first to fourth ports. The first port is connected to the discharge side of the compressor 1, the second port to the heat source side heat exchanger 3, the third port to the suction side of the compressor 1, and the fourth port to the low-pressure pipe 18. Further, the four-way valve 2 is configured such that its setting can be switched between a state in which the first port and the second port is in communication with each other while the third port and the fourth port are closed (a state indicated by a solid line in FIG. 1) and a state in which the third port and the fourth port is in communication with each other while the first port and the second port are closed (a state indicated by a broken line in FIG. 1).

The heat source side heat exchanger 3 is a cross-fin type fin-and-tube heat exchanger including a heat transfer pipe and a plurality of fins, for example, and exchanges heat between outside air and the refrigerant to exhaust heat. Further, the heat source side fan 4 includes a fan that is capable of varying a flow rate of the air supplied to the heat source side heat exchanger 3 and is, for example, a propeller fan that is driven by a motor (not shown) including a DC fan. The accumulator 19 has a function of storing excessive refrigerant during operation and further has a function of retaining liquid refrigerant that is temporarily generated during change in the operating state, so as to prevent a large amount of liquid refrigerant from flowing into the compressor 1.

The block-of-check-valves 5 includes four check valves 5a to 5d and is provided to control the flow direction of the refrigerant. There are pipe 22 and pipe 26 in the block-of-check-valves 5. The pipe 22 is a pipe that connects a connecting point d between the four-way valve 2 and the check valve 5b to a connecting point b between the check valve 5a and the high-pressure pipe 6. The pipe 26 is a pipe that connects a connecting point c between the check valve 5b and the low-pressure pipe 18 to a connecting point a between the check valve 5a and the heat source side heat exchanger 3.

The check valve 5a permits the refrigerant to flow only in the direction from the connecting point a to the connecting point b, and the check valve 5b permits the refrigerant to flow only in the direction from the connection point c to the connection point d. The check valve 5c is disposed in the pipe 22 and permits the refrigerant to flow only in the direction from the connecting point d to the connecting point b, and the check valve 5d is disposed in the pipe 26 and permits the refrigerant to flow only in the direction from the connection point c to the connection point a. By providing this block-of-check-valves 5, irrespective of the operation mode, the flow direction of the refrigerant becomes such that the refrigerant flows towards the heat source unit 301 from the relay unit 302 in the low-pressure pipe 18 and such that the refrigerant flows towards the relay unit 302 from the heat source unit 301 in the high-pressure pipe 6.

In the heat source unit 301, a pressure sensor 201 is provided on the discharge side of the compressor 1 and a pressure sensor 211 is provided on the suction side of the compressor 1, each measuring the refrigerant pressure at their disposed positions. Further, a temperature sensor 202 is provided on the discharge side of the compressor 1 and a temperature sensor 203 is provided on the liquid side of the heat source side heat exchanger 3, each measuring the refrigerant temperature at their disposed positions. Furthermore, a temperature sensor 204 is provided in the air inlet port and measures the outside air temperature.

<Relay Unit 302>

The relay unit 302 controls the refrigerant flow in accordance with the operation requested to the use units 303a and 303b that are disposed, for example, indoors. The relay unit 302 includes a gas-liquid separator 7, solenoid valves 17a and 17b, solenoid valves 24a and 24b, check valves 12a and 12b, check valves 25a and 25b, a subcooling heat exchanger 9 and a subcooling heat exchanger 11, a liquid pressure reduction mechanism 10 and a bypass pressure reduction mechanism 20, a pipe 8, a pipe 21, and a pipe 23.

The pipe 8 interconnects the gas-liquid separator 7 and the subcooling heat exchanger 9, and the pipe 23 interconnects the gas-liquid separator 7 and each of the solenoid valves 24a and 24b. The gas-liquid separator 7 separates the refrigerant that has flowed through the high-pressure pipe 6 into a gas refrigerant and a liquid refrigerant, in which the liquid refrigerant flows to the pipe 8 and the gas refrigerant flows to the pipe 23.

Each of the solenoid valves 17a and 17b and each of the solenoid valves 24a and 24b controls the direction of the refrigerant flowing in the corresponding one of the use units 303a and 303b to which they are connected. Each of the check valves 12a and 12b permits the refrigerant to flow only in the direction from the subcooling heat exchanger 11 to the respective one of the indoor liquid branch pipes 13a to 13b, and each of the check valves 25a and 25b permits the refrigerant to flow only in the direction from the respective one of the indoor liquid branch pipes 13a and 13b to the subcooling heat exchanger 11.

The pipe 21 branches from the pipe between the outlet of the high-pressure side of the subcooling heat exchanger 11 and the check valves 12a and 12b. The pipe 21 is connected to the pipe between the solenoid valves 17a and 17b and the inlet of the low-pressure pipe 18.

The subcooling heat exchanger 9 is a double-pipe heat exchanger in which a low-pressure refrigerant that has passed through the bypass pressure reduction mechanism 20 flows through the inside thereof and in which a high-pressure refrigerant that has passed through the pipe 8 flows through the outside thereof. The subcooling heat exchanger 9 exchanges heat between the high-pressure refrigerant and the low-pressure refrigerant such that the high-pressure refrigerant is cooled and the low-pressure refrigerant is heated. The subcooling heat exchanger 11 is a double-pipe heat exchanger in which the low-pressure refrigerant that has passed through the bypass pressure reduction mechanism 20 flows through the inside thereof and in which a high-pressure refrigerant that is to pass through the liquid pressure reduction mechanism 10, or the liquid pressure reduction mechanism 10 and the check valves 25a and 25b flows through the outside thereof. In the subcooling heat exchanger 11, heat is exchanged between the high-pressure refrigerant and the low-pressure refrigerant such that the high-pressure refrigerant is cooled and the low-pressure refrigerant is heated.

Each of the liquid pressure reduction mechanism 10 and the bypass pressure reduction mechanism 20 can control the flow rate of the refrigerant and can be set to vary its opening degree.

The relay unit 302 includes a pressure sensor 205, a pressure sensor 206, a temperature sensor 207, a temperature sensor 212, a temperature sensor 213, and a temperature sensor 214. The pressure sensor 205 is provided between the high-pressure side of the subcooling heat exchanger 9 and the liquid pressure reduction mechanism 10 and measures a refrigerant pressure in its disposed position. Further, the pressure sensor 206 is provided between the liquid pressure reduction mechanism 10 and the high-pressure side of the subcooling heat exchanger 11 and measures a refrigerant pressure in its disposed position. Furthermore, the temperature sensor 207 is provided between the high-pressure side of the subcooling heat exchanger 11 and the check valves 12a and 12b; the temperature sensor 212 is provided at the outlet of the bypass pressure reduction mechanism 20; the temperature sensor 213 is provided at the outlet of the low-pressure side of the subcooling heat exchanger 9; and the temperature sensor 214 is disposed in the pipe 8. Each temperature sensor measures a refrigerant temperature in its disposed position.

<Use Units 303a and 303b>

The use units 303a and 303b includes use side pressure reduction mechanisms 14a and 14b and use side heat exchangers 15a and 15b, respectively. Each of the use side pressure reduction mechanisms 14a and 14b can control the flow rate of the refrigerant and can be set to vary its opening degree. Each of the use side heat exchangers 15a and 15b is, for example, a cross-fin type fin-and-tube heat exchanger including a heat transfer pipe and a plurality of fins and exchanges heat between the indoor air and the refrigerant.

In the use units 303a and 303b, temperature sensors 208a and 208b are provided on the liquid side of the use side heat exchangers 15a and 15b, respectively, and temperature sensors 209a and 209b are provided on the gas side of the use side heat exchangers 15a and 15b, respectively, each measuring the refrigerant temperature at its disposed position. Further, temperature sensors 210a and 210b are provided in the respective one of air inlet ports and measure the air temperature.

<Unit Controlling Device 101, Refrigerant Charge Assisting Device 121>

In the heat source unit 301, a unit controlling device 101 that is constituted by, for example, a microcomputer is provided. Further, in an external controller 320, the refrigerant charge assisting device 121 that is constituted by a microcomputer is provided. The refrigerant charge assisting device 121 is installed with a refrigerant charge assisting program that implements various processing such as computing of a target refrigerant charge amount and an additional charge amount, which will be described later. The refrigerant charge assisting device 121 functions as the refrigerant charge assisting device of the present disclosure. The external controller 320 is operated by, for example, a worker carrying out the refrigerant charging work, and includes a notebook PC, a tablet PC, or the like, and is configured so as to be capable of communicating with the unit controlling device 101 of the heat source unit 301.

Figure 2:
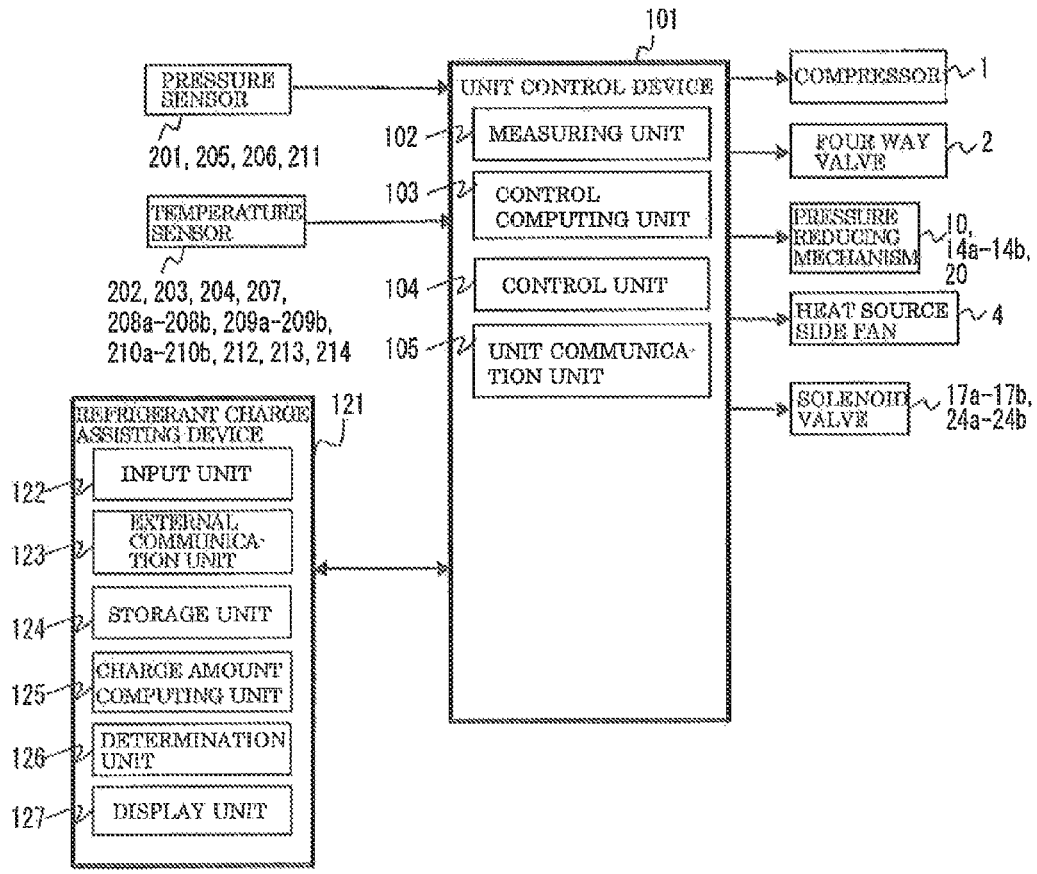
FIG. 2 is a block diagram illustrating a configuration of a unit controlling device 101 and the refrigerant charge assisting device 121 according to the first exemplary embodiment of the present disclosure.

FIG. 2 is a block diagram illustrating a configuration of the unit controlling device 101 and the refrigerant charge assisting device 121 according to the first exemplary embodiment of the present disclosure.

The unit controlling device 101 includes a measuring unit 102, a control computing unit 103, a control unit 104, and a unit communication unit 105. In the unit controlling device 101, amounts detected by each temperature sensor and each pressure sensor are input to the measuring unit 102. The control computing unit 103 executes computing that determines various control operations such as, for example, computing of the saturation temperature of the detection pressure on the basis of the input information. Further, the control unit 104 controls various devices such as the compressor 1 and the heat source side fan 4 on the basis of the computing results of the control computing unit 103.

The unit communication unit 105 has a communication function that is capable of inputting information related to communication data from communication means such as a telephone line, a LAN line, or wireless and is capable of outputting information externally. The unit communication unit 105 receives a cooling command (cooling ON/OFF) or a heating command (heating ON/OFF) that has been output from the use side remote control (not shown), and transmits and receives commands, measured values, and device control methods to and from the refrigerant charge assisting device 121.

The refrigerant charge assisting device 121 is provided with an input unit 122, an external communication unit 123, a storage unit 124, a charge amount computing unit 125, a determination unit 126, and a display unit 127. The user inputs to the input unit 122 a command to start a refrigerant charge amount detection operation mode and an initial refrigerant charge amount. The external communication unit 123 is capable of inputting information related to communication data from communication means such as a telephone line, a LAN line, or wireless and is capable of outputting information externally. The external communication unit 123 transmits the input information of the input unit 122 to the unit communication unit 105, transmits a signal to start the refrigerant charge amount detection operation described below, and receives operation data of the refrigerant circuit from the unit communication unit 105. The external communication unit 123 corresponds to an operation data acquisition unit of the present disclosure. Note that operation data is environmental condition data (air temperature) and unit operation condition data (refrigerant temperature and refrigerant pressure). That is, operation data is various measured values obtained from each pressure sensor and each temperature sensor.

The storage unit 124 includes a semiconductor memory and stores the refrigerant charge assisting program, specification of the heat source side heat exchanger 3, standard operation data that is operation data of the refrigerant circuit during a standard operating state described later, an approximation formula needed for computing the refrigerant amount, and the method of the refrigerant charge amount detection operation.

During computing of the refrigerant amount, the charge amount computing unit 125 computes the internal volume of the pipes, the target refrigerant charge amount, and the additional refrigerant charge amount. The determination unit 126 determines whether the charged refrigerant amount is insufficient or overcharged, and whether the operating state of the refrigerant circuit is stable. The external communication unit 123, the charge amount computing unit 125, and the determination unit 126 are processing units that are functionally organized by the installed refrigerant charge assisting program.

The display unit 127 is a display such as a liquid crystal screen and is mounted on the external controller 320. The display unit 127 displays whether the charged refrigerant amount is appropriate, the additional refrigerant charge amount, and the operation data of the units.

<Normal Operation Mode>

In the air-conditioning apparatus 100, devices equipped in the heat source unit 301 and the use units 303a and 303b are controlled according to the air conditioning commands requested to the use units 303a and 303b. As regards the normal operation mode performed by the air-conditioning apparatus 100, there are four operation modes, namely, a cooling only operation mode, a heating only operation mode, a cooling main operation mode, and a heating main operation mode. Next, description will be given on each of the normal operation modes.

(Cooling Only Operation Mode)

The cooling only operation mode is an operation mode in which both the use units 303a and 303b are in cooling operation. In the cooling only operation mode, the four-way valve 2 is switched to the solid line side in FIG. 1 such that the discharge side of the compressor 1 is connected to the gas side of the heat source side heat exchanger 3 and the suction side of the compressor 1 is connected to the connecting point d. Further, the solenoid valves 17a and 17b are opened, the solenoid valves 24a and 24b are closed, and the liquid pressure reduction mechanism 10 is fully opened.

A high-temperature high-pressure gas refrigerant discharged from the compressor 1 flows into the heat source side heat exchanger 3 through the four-way valve 2 and rejects heat to the outdoor air that has been sent from the heat source side fan 4. The refrigerant that has flowed out of the heat source side heat exchanger 3 flows through the high-pressure pipe 6 and the gas-liquid separator 7 via the check valve 5a, then, flows through the pipe 8, and is cooled by the low-pressure refrigerant in the subcooling heat exchanger 9. The refrigerant that has been cooled in the subcooling heat exchanger 9 flows through the fully opened liquid pressure reduction mechanism 10 and is cooled by the low-pressure refrigerant in the subcooling heat exchanger 11. Then, the refrigerant that has been cooled in the subcooling heat exchanger 11 is divided into a refrigerant that flows to the check valves 12*a* and 12*b* and a refrigerant that flows to the bypass pressure reduction mechanism 20.

The refrigerant that has flowed into the check valves 12*a* and 12*b* side flows into the use units 303*a* and 303*b* through the indoor liquid branch pipes 13*a* and 13*b*, respectively. The refrigerant that has flowed into the use units 303*a* and 303*b* is decompressed in the use side pressure reduction mechanisms 14*a* and 14*b*, respectively, and turns into a low-pressure two-phase refrigerant. The refrigerant turns into a low-pressure gas refrigerant after cooling the indoor air in the use side heat exchangers 15*a* and 15*b*. Then, this low-pressure gas refrigerant passes through the solenoid valves 17*a* and 17*b* via the indoor gas branch pipes 16*a* and 16*b*, respectively, and flows towards the heat source unit 301.

Meanwhile, the refrigerant that has flowed to the bypass pressure reduction mechanism 20 side is decompressed by the bypass pressure reduction mechanism 20 and turns into a low-pressure two-phase refrigerant. Then, the refrigerant flows into the low-pressure side of the subcooling heat exchanger 11 and is heated by the high-pressure refrigerant. This heated refrigerant is further heated in the low-pressure side of the subcooling heat exchanger 9 by the high-pressure refrigerant and merges with the refrigerant that has flowed to the check valves 12*a* and 12*b* side and that has passed through the use units 303*a* and 303*b*. The merged refrigerant flows through the low-pressure pipe 18, the check valve 5*b*, and the four-way valve 2 and is suctioned into the compressor 1 again after flowing through the accumulator 19.

(Heating Only Operation Mode)

Next, description will be given on the heating only operation mode. The heating only operation mode is an operation mode in which both the use units 303*a* and 303*b* are in heating operation. In the heating only operation mode, the four-way valve 2 is switched to the broken line side in FIG. 1 such that the discharge side of the compressor 1 is connected to the connecting point d and the suction side of the compressor 1 is connected to the gas side of the heat source side heat exchanger 3. Further, the solenoid valves 17*a* and 17*b* are closed, the solenoid valves 24*a* and 24*b* are opened, and the liquid pressure reduction mechanism 10 is totally closed.

A high-temperature high-pressure gas refrigerant discharged from the compressor 1 flows into the gas-liquid separator 7 through the four-way valve 2, the check valve 5*c*, and the high-pressure pipe 6. The gas refrigerant that has flowed out of the gas-liquid separator 7 flows into the indoor gas branch pipes 16*a* and 16*b* via the pipe 23 and the solenoid valves 24*a* and 24*b* and turns into a high-pressure liquid refrigerant after heating the indoor air in the use side heat exchangers 15*a* and 15*b*. This high-pressure liquid refrigerant is decompressed in the use side pressure reduction mechanisms 14*a* and 14*b* and is turned into an intermediate-pressure two-phase refrigerant, and then, flows into the indoor liquid branch pipes 13*a* and 13*b*.

The refrigerant that has flowed into the indoor liquid branch pipes 13*a* and 13*b* flows into the high-pressure side of the subcooling heat exchanger 11 through the check valves 25*a* and 25*b* and turns into a low-pressure two-phase refrigerant after being decompressed in the bypass pressure reduction mechanism 20. This low-pressure two-phase refrigerant flows through the low-pressure side of the subcooling heat exchanger 11 and the low-pressure side of the subcooling heat exchanger 9. The refrigerant that has passed through the low-pressure side of the subcooling heat exchanger 9 flows into the heat source side heat exchanger 3 via the pipe 21, the low-pressure pipe 18, and the check valve 5*d*. The refrigerant that has flowed into the heat source side heat exchanger 3 removes heat from the outdoor air that has been sent from the heat source side fan 4 and turns into a low-pressure gas refrigerant. After passing through the accumulator 19 via the four-way valve 2, this low-pressure gas refrigerant is suctioned into the compressor 1 again.

(Cooling Main Operation Mode)

Next, description will be given on the cooling main operation mode. The cooling main operation mode is an operation mode in which, among the use units 303*a* and 303, one is in cooling operation and the other is in heating operation and in which the cooling load is larger than the heating load. In the cooling main operation mode, the four-way valve 2 is switched to the solid line side in FIG. 1 such that the discharge side of the compressor 1 is connected to the gas side of the heat source side heat exchanger 3 and the suction side of the compressor 1 is connected to the connecting point d. Here, description will be made assuming that the use unit 303*a* is in cooling operation and the use unit 303*b* is in heating operation. Further, the solenoid valve 17*a* is opened, the solenoid valve 17*b* is closed, the solenoid valve 24*a* is closed, and the solenoid valve 24*b* is opened.

A high-temperature high-pressure gas refrigerant discharged from the compressor 1 flows into the heat source side heat exchanger 3 through the four-way valve 2 and rejects heat to the outdoor air that has been sent from the heat source side fan 4. The refrigerant that has flowed out of the heat source side heat exchanger 3 flows through the high-pressure pipe via the check valve 5*a* and flows into the gas-liquid separator 7. The refrigerant that has flowed into the gas-liquid separator 7 is divided into a refrigerant that flows in the pipe 8 and a refrigerant that flows in the pipe 23. The refrigerant that has flowed to the pipe 8 side is cooled by a low-pressure refrigerant in the subcooling heat exchanger 9 and, then, turns into a intermediate-pressure refrigerant after being decompressed in the liquid pressure reduction mechanism 10. Meanwhile, the refrigerant that has flowed through the pipe 23 passes through the solenoid valve 24*b* and the indoor gas branch pipe 16*b* and, then, heats the indoor air in the use side heat exchanger 15*b* and turns into a high-pressure liquid refrigerant.

This high-pressure liquid refrigerant flows through the indoor liquid branch pipe 13*b* and the check valve 25*b* after being decompressed into an intermediate-pressure refrigerant by the use side pressure reduction mechanism 14*b* and merges with the refrigerant that has flowed to the pipe 8 side from the gas-liquid separator 7 and that has been decompressed by the liquid pressure reduction mechanism 10. The merged refrigerant is cooled by the low-pressure refrigerant in the subcooling heat exchanger 11 and is divided into a refrigerant that flows to the check valve 12*a* and a refrigerant that flows through the bypass pressure reduction mechanism 20.

The refrigerant that has flowed to the check valve 12*a* side flows through the indoor liquid branch pipe 13*a* and is decompressed in the use side pressure reduction mechanism 14*a*, turning into a low-pressure two-phase refrigerant. The refrigerant turns into a low-pressure gas refrigerant after cooling the indoor air in the use side heat exchanger 15*a*. This low-pressure gas refrigerant passes through the solenoid valve 17*a* via the indoor gas branch pipe 16*a* and flows towards the heat source unit 301.

Meanwhile, the refrigerant that has flowed into the bypass pressure reduction mechanism 20 side is decompressed by the bypass pressure reduction mechanism 20 and turns into a low-pressure two-phase refrigerant. Then, the refrigerant flows into the low-pressure side of the subcooling heat exchanger 11 and is heated by the high-pressure refrigerant. This heated refrigerant is further heated in the low-pressure side of the subcooling heat exchanger 9 by the high-pressure refrigerant and merges with the refrigerant that has flowed to the check valve 12a side and that has passed through the use unit 303a. The merged refrigerant flows through the low-pressure pipe 18, the check valve 5b, and the four-way valve 2 and is suctioned into the compressor 1 again after flowing through the accumulator 19.

(Heating Main Operation Mode)

Next, description will be given on the heating main operation mode. The heating main operation mode is an operation mode in which, among the use units 303a and 303, one is in cooling operation and the other is in heating operation and in which the heating load is larger than the cooling load. In the heating main operation mode, the four-way valve 2 is switched to the broken line side in FIG. 1 such that the discharge side of the compressor 1 is connected to the connecting point d and the suction side of the compressor 1 is connected to the gas side of the heat source side heat exchanger 3. Here, description will be made assuming that the use unit 303a is in cooling operation and the use unit 303b is in heating operation. Further, the solenoid valve 17a is opened, the solenoid valve 17b is closed, the solenoid valve 24a is closed, the solenoid valve 24b is opened, and the liquid pressure reduction mechanism 10 is totally closed.

A high-temperature high-pressure gas refrigerant discharged from the compressor 1 flows into the gas-liquid separator 7 through the four-way valve 2, the check valve 5c, and the high-pressure pipe 6. The gas refrigerant that has flowed out of the gas-liquid separator 7 flows into the indoor gas branch pipe 16b via the pipe 23 and the solenoid valve 24b and turns into a high-pressure liquid refrigerant after heating the indoor air in the use side heat exchanger 15b. This high-pressure liquid refrigerant is decompressed in the use side pressure reduction mechanism 14b and is turned into an intermediate-pressure two-phase refrigerant, and then, flows into the indoor liquid branch pipe 13b. The refrigerant that has flowed into the indoor liquid branch pipe 13b flows into the high-pressure side of the subcooling heat exchanger 11 through the check valve 25b and is divided into a refrigerant that flows in the check valve 12a and a refrigerant that flows in the bypass pressure reduction mechanism 20.

The refrigerant that has flowed to the check valve 12a side flows through the indoor liquid branch pipe 13a and is decompressed in the use side pressure reduction mechanism 14a, turning into a low-pressure two-phase refrigerant. The refrigerant turns into a low-pressure gas refrigerant after cooling the indoor air in the use side heat exchanger 15a. This gas refrigerant passes through the solenoid valve 17a via the indoor gas branch pipe 16a and flows towards the heat source unit 301.

Meanwhile, the refrigerant that has flowed into the bypass pressure reduction mechanism 20 turns into a low-pressure two-phase refrigerant after being decompressed by the bypass pressure reduction mechanism 20. Then the refrigerant is heated by the high-pressure refrigerant in the subcooling heat exchanger 11. This heated refrigerant passes through the low-pressure side of the subcooling heat exchanger 9 and the pipe 21 and merges with the refrigerant that has flowed to the check valve 12a side and that has passed through the use unit 303a. The merged refrigerant flows into the heat source side heat exchanger 3 via the low-pressure pipe 18 and the check valve 5d. The refrigerant that has flowed into the heat source side heat exchanger 3 removes heat from the outdoor air that has been sent from the heat source side fan 4 and turns into a low-pressure gas refrigerant. After passing through the accumulator 19 via the four-way valve 2, this low-pressure gas refrigerant is suctioned into the compressor 1 again.

In each of the operation modes described above, the unit controlling device 101 performs the following control.

The unit controlling device 101 controls the opening degree of the use side pressure reduction mechanisms 14a and 14b such that the superheat in the use side heat exchangers 15a and 15b becomes a target value (3° C., for example). The superheat in each of the use side heat exchangers 15a and 15b is a value obtained by subtracting a detection temperature of the corresponding one of the temperature sensors 208a and 208b from a detection temperature of the corresponding one of the temperature sensors 209a and 209b.

Further, the unit controlling device 101 controls the bypass pressure reduction mechanism 20 such that the superheat in the low-pressure side of the subcooling heat exchanger 9 becomes a target value (3° C., for example). The superheat in the low-pressure side of the subcooling heat exchanger 9 is obtained by subtracting a detection temperature of the temperature sensor 212 from a detection temperature of the temperature sensor 213.

Further, the unit controlling device 101 controls the heat source side fan 4 such that a condensing temperature becomes a target value. Note that the condensing temperature is a saturated gas temperature of the detection pressure of the pressure sensor 201.

<Refrigerant Charge Amount Detection Operation Mode>

After installation work of the air-conditioning apparatus 100, the worker carries out adjustment of the refrigerant amount through trail runs. Conventionally, adjustment of the refrigerant amount is carried out such that refrigerant is gradually charged while the operating state of the air-conditioning apparatus 100 is monitored. The charging is repeatedly carried out until an adequate operating state is reached. However, since the operating state needs to be judged each time, work errors are likely to occur. Further, since the shorter the pipe length, the greater the change in the operating state associated to the charged refrigerant amount, in order to avoid overcharging, the refrigerant needs to be charged consequently in small amounts, rendering the charging work to be time consuming. Accordingly, charging work can be carried out in a short time and with ease by employing the present disclosure.

<Refrigerant Charge Amount Determination Process>

Figure 3:
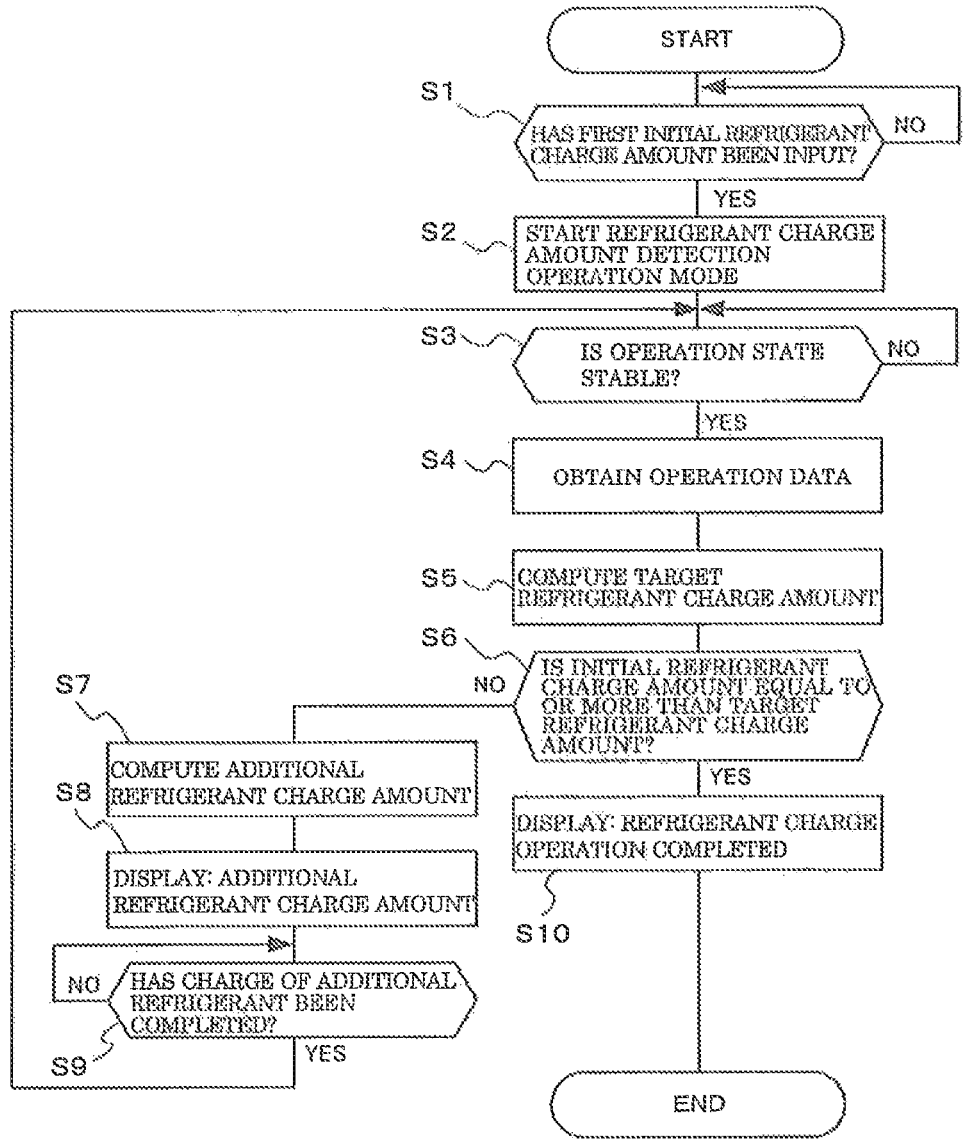
FIG. 3 is a flowchart illustrating a refrigerant charge amount determination process in which computation (computation method 1) of the target refrigerant charge amount is applied to the refrigerant charge assisting device 121 according to the first exemplary embodiment of the present disclosure.

FIG. 3 is a flowchart illustrating a refrigerant charge amount determination process in which computation (computation method 1) of the target refrigerant charge amount is applied to the refrigerant charge assisting device 121 according to the first exemplary embodiment of the present disclosure. A broad procedure of the process carried out in the refrigerant charge assisting device 121 will be described below. The detailed description of the operation in each step will be given after describing the above.

After completion of installation work of the air-conditioning apparatus 100, first, as a preliminary step, the worker carries out initial charging of the refrigerant to the amount that allows a trial run to be conducted. Subsequently, the worker operates the input unit 122 to activate the refrigerant charge assisting program. With this, the process in the flowchart illustrated in FIG. 3 is started. Note that in the below description, phrases such as "the 'external communication unit 123, charge amount computing unit 125, determination unit 126' performs control" will be omitted.

The refrigerant charge assisting device 121 displays a display on the display unit 127 encouraging input of the initial refrigerant charge amount. According to the display, when the initial refrigerant charge amount is input from the input unit 122 (S1), the refrigerant charge assisting device 121 transmits, to the refrigerant circuit, a signal that starts the refrigerant charge amount detection operation mode so that the refrigerant circuit starts the refrigerant charge amount detection operation mode (S2). Note that the "initial refrigerant charge amount" is a total value of the refrigerant amount that has been charged in the preliminary stage and the refrigerant amount that has been filled in the heat source unit 301 in advance.

When a predetermined time has elapsed after start of the refrigerant charge amount detection operation mode in the refrigerant circuit and when the operating state of the refrigerant circuit becomes stable (S3), the refrigerant charge assisting device 121 acquires operation data of the refrigerant circuit from each of the corresponding sensors (S4). Then, the refrigerant charge assisting device 121 computes the target refrigerant charge amount from the operation data, the initial refrigerant charge amount, and the standard operation data of the refrigerant circuit during the standard operating state described later (S5). After that, the refrigerant charge assisting device 121 compares the initial refrigerant charge amount and the target refrigerant charge amount (S6) and, when the initial refrigerant charge amount is smaller than the target refrigerant charge amount, subtracts the initial refrigerant charge amount from the target refrigerant charge amount to calculate the additional refrigerant charge amount (S7). The additional refrigerant charge amount is displayed on the display unit 127 (S8).

When it is detected that the displayed amount has been additionally charged by the worker who has confirmed this display (S9), the refrigerant charge assisting device 121 returns to step S3. That is, when the operating state becomes stable, the refrigerant charge assisting device 121 acquires the operation data once more, repeating the computation of the target refrigerant charge amount and the display of the additional refrigerant charge amount. The reason for the above will be described.

There are cases in which the refrigerant charging work is completed with a single charging work if a charge amount close to the target refrigerant charge amount has been charged in the first initial charging; however, normally, it is repeated a number of times. Each time the refrigerant is charged, the target refrigerant charge amount and the additional refrigerant charge amount are computed, the computed additional refrigerant charge amount is displayed, and charging work is carried out by the worker who has confirmed the display. Here, the additional refrigerant charge amount, displayed in step S7, is displayed with an upper limit of 20% of the target refrigerant charge amount (note, the lower limit is a value that is more than 0% of the target refrigerant charge amount). Accordingly, if the computed additional refrigerant charge amount in step S7 is equivalent to or less than 20% of the target refrigerant charge amount, the computed additional refrigerant charge amount is displayed as it is, but if exceeding 20% of the target refrigerant charge amount, the limited value is displayed. This is to prevent overcharging. The reason for this will be described in detail later in the (Limiting the additional refrigerant charge amount MrADD).

A specific example will be described. When assuming that the target refrigerant charge amount is 40 kg and the upper limit of the addition is 20%, then the upper value of the additional refrigerant charge amount will be 8 kg. Further, when assuming that the computed additional refrigerant charge amount in step S7 is 10 kg, since this exceeds the upper limit of the additional refrigerant charge amount of 8 kg, 10 kg will not be displayed and 8 kg will be displayed. In this case, since it is a fraction of the actually required additional refrigerant charge amount of 10 kg, the charging work is carried out again. Note that the overcharged amount can also be calculated in the first exemplary embodiment. The overcharged amount does not need to be displayed in a limited manner and the calculated overcharged amount is displayed as it has been calculated.

This process will be described according to the flowchart in FIG. 3. The worker having confirmed the display content, such as "additional refrigerant charge amount 8 kg", charges 8 kg of refrigerant, and when the refrigerant charge assisting device 121 detects that 8 kg of refrigerant has been charged (S9), returns to step S3, and when the operating state becomes stable, acquires the operation data (S4). Then, the refrigerant charge assisting device 121 carries out computation of the target refrigerant charge amount for the second time (S5) and performs a comparison in step S6.

Regarding the initial refrigerant charge amount of the second step S6, an added value of the initial refrigerant charge amount that has been input in step S1 (30 kg, in this case) and the additional refrigerant charge amount that has been calculated in step S7 is used. Accordingly, the initial refrigerant charge amount of this step is 30 kg+8 kg, that is, 38 kg, and is not equivalent to or more than the target refrigerant charge amount of 40 kg. Thus, the refrigerant charge assisting device 121 carries out computation of the additional refrigerant charge amount for the second time (S7). Here, a second additional refrigerant charge amount of 2 kg is computed by the refrigerant charge assisting device 121, and, as it is, 2 kg is displayed (S8). The worker having confirmed this display charges 2 kg of refrigerant, and when this is detected by the refrigerant charge assisting device 121 (S9), the process returns to S3 again and computing of the target refrigerant charge amount is carried out in a similar manner (S4 and S5).

Then, the refrigerant charge assisting device 121 sets the current (third time) initial refrigerant charge amount to 40 kg, which is obtained by adding the previous (second time) initial refrigerant charge amount of 38 kg and the additional refrigerant charge amount of 2 kg calculated in step S7, and compares this with the target refrigerant charge amount of 40 kg (S6). Here, since the initial refrigerant charge amount and the target refrigerant charge amount are equal to each other, the refrigerant charge assisting device 121 displays the end of the refrigerant charging work on the display unit 127 (S10) and ends the refrigerant charge assisting program along with the refrigerant charge amount detection operation mode. Note that an example is given in which the refrigerant charging work is completed by two charges; however, the charging work may be carried out with a similar procedure in a case requiring three or more charges, as well.

The refrigerant charge amount detection operation mode that starts its operation in step S2 is an operation mode carried out so that excessive liquid refrigerant does not accumulate in the accumulator 19 serving as a liquid reservoir. In the refrigerant charge amount detection operation mode, operation is performed in a normal operation mode that requires the largest refrigerant amount to be circulated in the refrigerant circuit. Specifically, the refrigerant charge amount detection operation mode is carried out with the flow state of the refrigerant being that of the cooling only operation mode in which the heat source side heat exchanger 3 that has a large internal volume becomes a condenser and, further, in which the refrigerant wetness is high in the high-pressure pipe 6. That is, the refrigerant charge amount detection operation mode is an operation mode that accumulates the refrigerant in the high-pressure side (the heat source side heat exchanger 3 and the high-pressure pipe 6), which becomes high in pressure during the cooling only operation mode as much as possible, in order to prepare for the calculation of the target refrigerant charge amount described later.

A control method of each devices during the refrigerant charge amount detection operation mode will be described next.

The operation method of the refrigerant circuit during the refrigerant charge amount detection operation mode is stored in the storage unit 124 as a part of the refrigerant charge assisting program and is transmitted to the unit communication unit 105 with the external communication unit 123 at the start of operation. On the basis of this information, the control unit 104 controls each device. In the refrigerant charge amount detection operation mode, the following control (A), (B), and (C) are carried out.

(A) The unit controlling device 101 controls the refrigerant circuit so that superheat is obtained. Since the target refrigerant charge amount is calculated from the operation data, as described above, the operating state needs to be turned into a state in which there is no liquid refrigerant in the liquid reservoir (in this case, the accumulator 19). Therefore, the refrigerant circuit is controlled so that superheat is obtained. The superheat is set to, for example, 3° C.

(B) The unit controlling device 101 controls the evaporating temperature to be constant at the target evaporating temperature. Here, the target evaporating temperature is set to the lowest temperature possible (the permissible minimum evaporating temperature (2° C., for example). By setting the target evaporating temperature to the lowest temperature possible, the calculation of the refrigerant amount is allowed to be carried out with high precision. The reason for this will be described later. The minimum value of the detection temperatures of the temperature sensors 208a and 208b is deemed as the measured value of the evaporating temperature. Not limited to the minimum value of the detection temperatures of the temperature sensors 208a and 208b, the evaporating temperature may be the saturated gas temperature of the detection pressure of the pressure sensor 211. The following (B-1) and (B-2) are methods to make the evaporating temperature become the target evaporating temperature.

(B-1) The operating capacity (operating frequency) of the compressor 1 is controlled.

The operating capacity of the compressor 1 is set to the permissible maximum operating capacity of the device such that the evaporating temperature is constant at the target evaporating temperature. By setting to a high-capacity operation as above, compared to that of a low-capacity operation, it is possible to move more refrigerant that has been distributed to the low-pressure side to the high-pressure side and, thus, accumulate the refrigerant on the high-pressure side. The calculation method of the target refrigerant charge amount will be described later. Since the target refrigerant charge amount is calculated on the assumption that the refrigerant is accumulated on the high-pressure side, the target refrigerant charge amount can be calculated with higher precision, the more the refrigerant is accumulated on the high-pressure side.

Note that if the evaporating temperature becomes lower than the target evaporating temperature when the operating capacity of the compressor 1 is set to its maximum operating capacity, then the operating capacity is reduced (the operating frequency is lowered) no that the evaporating temperature becomes the target evaporating temperature. Further, not limited to the method in which the operating capacity of the compressor 1 is set to its maximum operating frequency from the first, the operation may be carried out with an operating capacity that is lower than the maximum operating frequency to some extent and the operating frequency may be increased while monitoring the evaporating temperature so that it will be reduced to the target evaporating temperature.

(B-2) The target superheat of the use side heat exchangers 15a and 15b are increased.

If the evaporating temperature does not drop to the target evaporating temperature even if the compressor 1 is operated at high-capacity with the method of (B-1) above, the target superheat of the use side heat exchangers 15a and 15b are increased (5° C., for example).

Specifically, regarding the control, the opening degree of the use side pressure reduction mechanisms 14a and 14b are throttled such that the superheat of the use side heat exchangers 15a and 15b becomes a new target superheat (in this case, 5° C.). With this, it is possible to reduce the evaporating temperature. Accordingly, the target superheat may be sequentially increased so that the evaporating temperature is reduced to the target evaporating temperature. By performing the above control, compared with (B-1) in which only the operating frequency of the compressor 1 is increased, the refrigerant that has been distributed to the low-pressure side can be moved further more to the high-pressure side. As such, the change in the outlet state of the heat source side heat exchanger 3 becomes larger relative to the refrigerant charge amount and it is possible to obtain the target refrigerant charge amount with high precision. That is, since the change in the outlet state of the heat source side heat exchanger 3 becomes larger, the change in the operating state against the refrigerant amount becomes larger.

(C) The unit controlling device 101 controls the rotation speed of the heat source side fan 4 such that the temperature difference between the condensing temperature between the compressor 1 and the use side pressure reduction mechanisms 14a and 14b and the outside air temperature is fixed or such that the rotation speed is fixed in accordance with the outside air temperature.

In the refrigerant charge amount detection operation mode, as described in (B-1) above, since it is understood in advance that the operating capacity of the compressor 1 is fixed to high capacity, it is possible to ascertain the amount of heat discharged from the heat source side heat exchanger 3 in advance. Accordingly, the rotation speed of the heat source side fan 4 may be controlled such that the temperature difference between the outside air temperature and the condensing temperature becomes a predetermined value (10° C., for example) in accordance with the amount of heat discharged from the heat source side heat exchanger 3, or such that the rotation speed is fixed in accordance with the outside air temperature. Note that the condensing temperature is a saturated gas temperature of the detection pressure of the pressure sensor 201.

In the refrigerant charge amount detection operation mode, since the operating state can be estimated in advance, it is possible to reduce the changing number of the rotation speed of the heat source side fan 4 and to perform stable operation. Accordingly, the operating state becomes stable in a short time and the transition time to the next target refrigerant charge amount calculating process can be made short, and, as a result, the refrigerant charge amount detection time (time it takes to display the additional refrigerant charge amount after the start of the refrigerant charge amount detection operation) can be made short.

As described above, the operation method of each device during the refrigerant charge amount detection operation mode is stored in the storage unit 124 as a refrigerant charge assisting program. Further, at the start of operation, information required for operating in the refrigerant charge amount detection operation mode is transmitted from the external communication unit 123 of the refrigerant charge assisting device 121 to the unit communication unit 105, and the control unit 104 of the unit controlling device 101 controls each device on the basis of this information.

Figure 4:
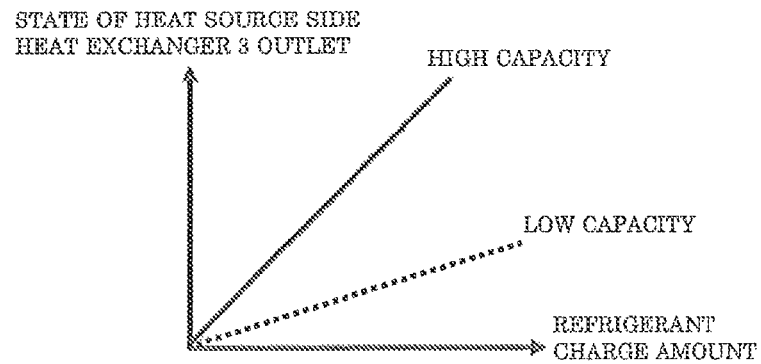
FIG. 4 is a schematic diagram illustrating relationships between the refrigerant charge amount and the outlet state of the heat source side heat exchanger 3 with respect to operations (a high capacity operation and a low capacity operation) of a compressor 1 of the air-conditioning apparatus 100 according to the first exemplary embodiment of the present disclosure.

FIG. 4 is a schematic diagram illustrating relationships between the refrigerant charge amount and the outlet state of the heat source side heat exchanger 3 with respect to operations (a high capacity operation and a low capacity operation) of the compressor 1 of the air-conditioning apparatus 100 according to the first exemplary embodiment of the present disclosure. The outlet state of the heat source side heat exchanger 3 is the quality when the refrigerant at the outlet of the heat source side heat exchanger 3 is in a two-phase state and is the liquid temperature when in a liquid state, for example. Since a larger amount of refrigerant flows to the high-pressure side during high-capacity operation compared to that during the low-capacity operation, the change in state at the outlet of the heat source side heat exchanger 3 becomes significant relative to the refrigerant charge amount; hence, it is possible to determine the target refrigerant charge amount with higher precision.

Further, when set to the high-capacity operation, since the subcooling at the outlet of the high-pressure side of the subcooling heat exchanger 11 is larger compared to that when set to the low-capacity operation, it is possible to perform computation of the additional refrigerant charge amount of the first exemplary embodiment with high precision even when the refrigerant amount is greatly insufficient. Further, when set to the high-capacity operation, since the circulating amount of refrigerant is larger compared to that when set to the low-capacity operation, the pass variation of the refrigerant in the heat source side heat exchanger 3 is improved and it is possible to compute the refrigerant amount in the heat source side heat exchanger 3 with high precision.

In order to compute the target refrigerant charge amount, as described above, it is required that there is no liquid refrigerant in the accumulator 19 serving as a liquid reservoir and that the operating state is stable. The operating time until the liquid refrigerant is removed from the accumulator 19 is longer the lower the outside air temperature. Accordingly, the timing to move to the target refrigerant charge amount calculating process after the liquid refrigerant is removed from the accumulator 19 cannot be simply determined by the operating time. That is, if the timing is simply determined by the operating time, in a case in which the outside air temperature is high, for example, there is a possibility in which the standby time becomes wastefully long without moving to the calculation process of the target refrigerant charge amount even when there is already no liquid refrigerant left in the accumulator 19.

Accordingly, in the refrigerant charge amount detection operation mode, it is detected that there is no liquid refrigerant left in the accumulator 19 and that the operating state is stable from the operation data of the refrigerant circuit so that wasteful standby time is reduced and that the refrigerant charge amount detection time is shortened to the extent possible.

Further, as described above, in the refrigerant charge amount detection operation mode, since the operating capacity of the compressor 1 is fixed to one of a high-capacity operation, it is possible to estimate the operating state corresponding to the outside air temperature. Accordingly, the unit controlling device 101 can determine the rotation speed control method of the heat source side fan 4 depending on the estimated operating state. That is, during the normal operation, which does not perform high-capacity operation and rotation speed control of the heat source side fan 4 that uses the estimated amount of heat discharged from the heat source side heat exchanger 3, the refrigerant charge amount detection can be carried out in a shorter time and with higher precision when the refrigerant charge amount detection operation is performed compared with when refrigerant amount computation and pipe internal volume computation, described later, are performed.

(Detection that there is No Liquid Refrigerant Left in the Accumulator 19)

Detection that there is no liquid refrigerant left in the accumulator 19 is carried out as below. By performing the refrigerant charge amount detection operation, the liquid refrigerant in the accumulator 19 is gradually reduced and this liquid refrigerant in the accumulator 19 is ultimately distributed to the heat source side heat exchanger 3 serving as a condenser and to the high-pressure pipe 6 serving as a liquid-side refrigerant extension pipe. Accordingly, when the liquid refrigerant is flowing out of the accumulator 19, the operation data and the operation state quantity such as the subcooling obtained from the operation data change as described below in (a) to (c).

(a) Increase in the subcooling between the heat source side heat exchanger 3 and the use side pressure reduction mechanisms 14a and 14b.

Specifically, (a-1) the subcooling at the outlet of the high-pressure side of the subcooling heat exchanger 11 increases, and (a-2) the subcooling at the outlet of the heat source side heat exchanger 3 increases.

(b) Increase in pressure between the discharge side of the compressor 1 and the liquid side of the use side pressure reduction mechanisms 14a and 14b.

Specifically, for example, (b-1) the high-pressure pressure detected by the pressure sensor 201 increases.

(c) The discharge temperature of the compressor 1 detected by the temperature sensor 202 increases.

Note that the subcooling at the outlet of the high-pressure side of the subcooling heat exchanger 11 is a value obtained by subtracting a temperature detected by the temperature sensor 207 from the saturation temperature of a pressure detected by the pressure sensor 201.

Accordingly, it is possible to detect that liquid refrigerant is flowing out of the accumulator 19 by using at least one of the operation data and the subcooling. That is, it can be determined that there is no liquid refrigerant left in the accumulator 19 upon stop of increase in the operation state quantity. When there is no liquid refrigerant in the accumulator 19, there will be no refrigerant to distribute to the high-pressure side and, thus, the operating state will become stable. Note that the subcooling at the outlet of the heat source side heat exchanger 3 is a value obtained by subtracting a detection temperature of the temperature sensor 203 from the saturation temperature of a detection pressure of the pressure sensor 201.

(Detection that the Operating State has Become Stable)

The detection that the operating state has become stable is carried out as below. When at least one of the temperature variation width (when in a case of the high-pressure pressure, the saturation temperature of the detection pressure) of the above (a) to (c), which are indicators to detect the flowing out of the liquid refrigerant from the accumulator 19, becomes equivalent to or less than a predetermined value ($\pm 1°$ C.) in a predetermined time (three minutes, for example), then it is determined that the operating state has become stable. Here, by using the subcooling at the outlet of the high-pressure side of the subcooling heat exchanger 11, it is possible to determine the stability of the operating state with high precision even when the subcooling of the outlet of the heat source side heat exchanger 3 cannot be obtained or when the refrigerant is insufficient to be obtained. This series of stability determination is performed by the determination unit 126. That is, the determination unit 126 determines whether the operating state has become stable on the basis of the operation data from the unit controlling device 101 acquired successively by the external communication unit 123.

Note that when a refrigerant is additionally charged in step S9 in the flowchart of FIG. 3, the additionally charged liquid refrigerant flows into the accumulator 19. Accordingly, when additional charging of refrigerant is carried out, the determination of whether the operating state has become stable needs to be carried out once more.

<Computing of Target Refrigerant Charge Amount (Computing Method 1)>

Now, description will be given of the computing method of the target refrigerant charge amount of step S5. In step S4, operation data is acquired and computation is carried out using the operation data.

As regards the target refrigerant charge amount, a standard operating state is assumed and the refrigerant amount when this standard operating state is achieved is calculated as the target refrigerant charge amount. The standard operating state is an operating state satisfying the operating condition when the unit performance was measured during unit development or the test condition when the refrigerant amount of the unit was determined, such as, for example, an operating condition satisfying the cooling standard condition of WS. Further, the condition may be one in which the low pressure or the high pressure becomes high, requiring a larger amount of refrigerant, such as the condition in which the outside air temperature, the indoor temperature is higher than the cooling standard condition of JIS. By setting the target refrigerant charge amount to the refrigerant amount achieving the operating state that satisfies these conditions, the charge amount will not be computed on the insufficient side and it will be possible to compute the target refrigerant charge amount that achieves a state allowing normal operation to be carried out without any problem.

These operating conditions are conditions in which the rotation speed (air volume) of the heat source side fan 4 is at its maximum available speed (air volume). That is, the standard operating state can be referred to as an operating state that is under a condition in which the outside air temperature, the indoor temperature require the heat source side fan 4 to be operated at its maximum rotation speed. Here, the temperature difference between the refrigerant temperature of the heat source side heat exchanger 3 and the outside air temperature is about 10° C. or more. Note that the refrigerant temperature of the heat source side heat exchanger 3 is a saturation temperature of the detection pressure of the pressure sensor 201.

The method for computing the target refrigerant charge amount will be described below. Note that the operation data acquired in step S4 is acquired in a state in which the flow of the refrigerant is of a cooling only operation mode. As such, the heat source side heat exchanger 3 functions as a condenser and each of the use side heat exchangers 15a and 15b functions as an evaporator.

Figure 5:
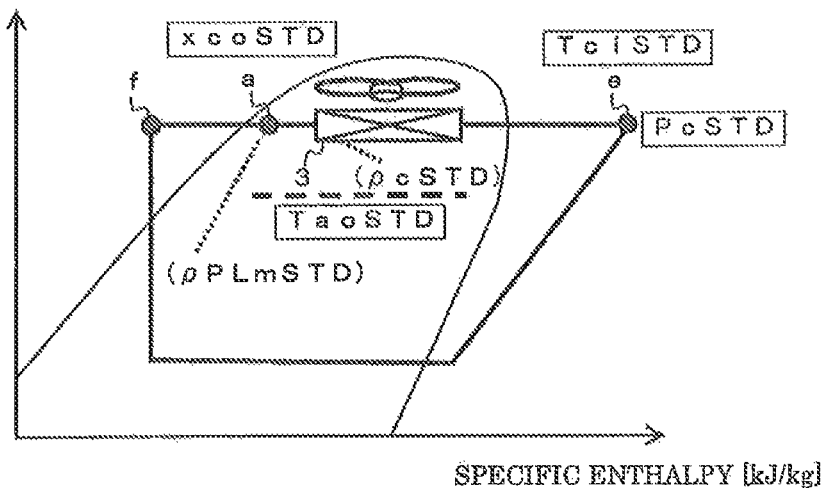
FIG. 5 is a pressure-enthalpy diagram illustrating an operating state of the air-conditioning apparatus 100 according to the first exemplary embodiment of the present disclosure after being set to a standard operating state.

FIG. 5 is a pressure-enthalpy diagram illustrating an operating state of the air-conditioning apparatus 100 according to the first exemplary embodiment of the present disclosure after being set to the standard operating state.

The refrigerant density of the condenser and the refrigerant density of the high-pressure pipe 6, which is a liquid side refrigerant extension pipe, during the standard operating state are obtained, and, as shown in the following Equation (1), a target refrigerant charge amount MrSTD is obtained.

[Math. 1]

$$Vc \times \rho cSTD + VPLm \times \rho PLmSTD = MrSTD \tag{1}$$

Where, $Vc$: internal volume [m³] the heat source side heat exchanger 3 serving as a condenser $\rho cSTD$: mean refrigerant density [kg/m³] of the heat source side heat exchanger 3 during the standard operating state $VPLm$: internal volume [m³] of the high-pressure pipe 6

$\rho PLmSTD$: refrigerant density [kg/m³] of the high-pressure pipe 6 during the standard operating state Vc is determined by the specification of the heat exchanger.

$\rho cSTD$ is determined by a high-pressure pressure PcSTD [MPaG], an inlet temperature TciSTD [° C.] of the heat source side heat exchanger 3, an outlet state (for example, quality xcoSTD [-]) of the heat source side heat exchanger 3, and an outside air temperature TaoSTD, during the standard operating state. Note that the high-pressure pressure PcSTD, the inlet temperature TciSTD of the heat source side heat exchanger 3, the outside air temperature TaoSTD, and the quality xcoSTD of the outlet of the heat source side heat exchanger 3, during the standard operating state, which are for obtaining the mean refrigerant density of the heat source side heat exchanger 3 during the standard operating state are prestored in the storage unit 124 of the refrigerant charge assisting device 121.

Since the computing method of $\rho cSTD$ is similar to the computing method of the mean refrigerant density $\rho c$ of the heat source side heat exchanger 3 described below, refer to the below method for the computing method of $\rho cSTD$.

Since the computing method of $\rho PLmSTD$ is similar to the computing method of the refrigerant density $\rho PLm$ of the high-pressure pipe 6, which is a liquid side refrigerant extension pipe, described below, refer to the below method for the computing method of $\rho PLmSTD$.

The computation of the internal volume VPLm of the high-pressure pipe 6 is carried out as below. Then, the target refrigerant charge amount MrSTD is obtained by substituting the internal volume VPLm of the high-pressure pipe 6, which has been obtained with the following computation, into Equation (1). Now, the computing method of the internal volume VPLm of the high-pressure pipe 6 will be described. The description is continued until the start of (Calculation of an additional refrigerant charge amount MrADD) described below.

The length of the high-pressure pipe is different depending on the installation condition of the installation site and it cannot be known beforehand at the time of shipping. Accordingly, the internal volume of the high-pressure pipe 6 needs to be obtained at each installation site. Since the above-described refrigerant charge amount detection operation has been conducted, the great majority of the charged refrigerant is assumed to be in the condenser (in this case, the heat source side heat exchanger 3) as a wet two-phase refrigerant or a liquid refrigerant in large amounts and in the liquid side refrigerant extension pipe (high-pressure pipe 6). That is, assuming that the total refrigerant amount of the heat source side heat exchanger 3 and the high-pressure pipe 6 is equal to the charged refrigerant amount, the following Equation (2) applies.

[Math. 2]

$$Vc \times \rho c + VPLm \times \rho PLm = Mr1 \tag{2}$$

Where, $Vc$: internal volume [m³] of the heat source side heat exchanger 3 serving as a condenser $\rho c$: mean refrigerant density [kg/m³] of the heat source side heat exchanger 3

ρPLm: refrigerant density [kg/m³] of the high-pressure pipe 6 which is a liquid side refrigerant extension pipe Mr1: initial refrigerant charge amount [kg]

VPLm: internal volume [m³] of the high-pressure pipe 6 which is a liquid side refrigerant extension pipe Vc is determined by the specification of the heat exchanger. Further, ρc and ρPLm can be computed from the operation data. Mr1 is an input value. VPLm is an unknown quantity. That is, since in Equation (2), the only unknown quantity is VPLm, VPLm is obtained.

Now, the calculation method of ρc and ρPLm in Equation (2) will be described in order.

First, the computing method of the mean refrigerant density ρc of the heat source side heat exchanger 3 will be described.

The heat source side heat exchanger 3 is a condenser. The computing method of the condenser mean refrigerant density ρc will be set forth. In most cases, in the determination performed at the time of the refrigerant charge, diagnosis is started from a case in which the charged refrigerant amount is insufficient. In such a case, the refrigerant at the outlet of the condenser is in a two-phase state. On the other hand, when the refrigerant charge amount is close to the adequate amount, there are cases in which the outlet of the condenser is in a liquid phase. Accordingly, in computing the internal volume VPLm of the high-pressure pipe 6 by substituting ρc into Equation (2), the computation needs to use a different ρc according to whether the outlet of the condenser is in a two-phase state or in a liquid state. Accordingly, a mean refrigerant density ρc of the heat source side heat exchanger 3 will be required for when the outlet of the condenser is in a two-phase state and for when the outlet of the condenser is in a liquid state. Therefore, a computation method of the mean refrigerant density ρc of the heat source side heat exchanger 3 when the outlet of the condenser is in a two-phase state and when the outlet of the condenser is in a liquid state will be described.

Here, before describing the computation method of the mean refrigerant density ρc of the heat source side heat exchanger 3, a method of determining whether the outlet of the condenser is in a two-phase state or a liquid state will be first described below.

Whether the outlet of the condenser is in a two-phase state or not can be determined by the quality xco [-] at the outlet of the condenser.

The quality xco at the outlet of the condenser can be obtained with the detection pressure of the pressure sensor 201 and the specific enthalpy Hco at the outlet of the condenser. The specific enthalpy Hco at the outlet of the condenser can be obtained through computation of quantity of heat of the subcooling heat exchanger.

Figure 6:
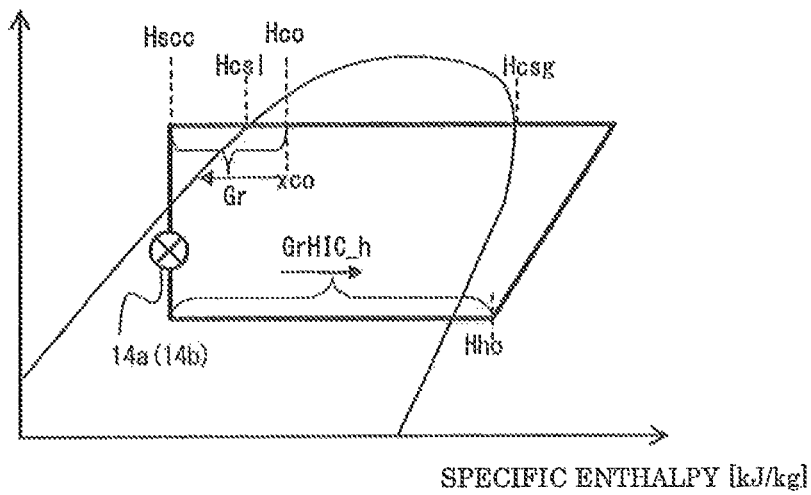
FIG. 6 is a P-h diagram for describing a method of obtaining quality at an outlet of a condenser related to the refrigerant charge assisting device 121 according to the first exemplary embodiment of the present disclosure.

FIG. 6 is a P-h diagram for describing a method of obtaining the quality at the outlet of the condenser related to the refrigerant charge assisting device 121 according to the first exemplary embodiment of the present disclosure.

Since the amount of heat discharged from the high-pressure refrigerant and the amount of heat absorbed by the low-pressure refrigerant are equivalent, the following Equation (3) for the total value of the exchanged quantity of heat of the subcooling heat exchanger 9 and the exchanged quantity of heat of the subcooling heat exchanger 11 applies.

[Math. 3]

$$GrHIC(Hho-Hscc)=Gr(Hco-Hscc) \quad (3)$$

Where,

GrHIC: refrigerant circulation amount [kg/s] of the bypass pressure reduction mechanism 20

Hco: specific enthalpy [kJ/kg] at the outlet of the condenser

Hho: specific enthalpy [kJ/kg] at the outlet of the low-pressure side of the subcooling heat exchanger 9

Hscc: specific enthalpy [kJ/kg] at the outlet of the high-pressure side of the subcooling heat exchanger 11

Gr: discharge flow rate [kg/s] of the compressor

GrHIC is obtained by the opening degree, the upstream side pressure, and the downstream side pressure of the bypass pressure reduction mechanism 20. Note that the upstream side pressure of the bypass pressure reduction mechanism 20 is the detection pressure of the pressure sensor 206 and the downstream side pressure of the bypass pressure reduction mechanism 20 is the pressure in which the detection temperature of the pressure sensor 212 is the saturation temperature.

Hho is obtained by the pressure in which the detection temperature of the pressure sensor 212 is the saturation temperature and the detection temperature of the temperature sensor 213. Since the refrigerant at the outlet of the high-pressure side of the subcooling heat exchanger 11 is positioned on the downstream side of the subcooling heat exchanger 11 and is in a liquid phase, Hscc is obtained by the detection temperature of the temperature sensor 207. Gr is obtained by the compressor frequency, the detection pressure of the pressure sensor 201, and the detection pressure of the pressure sensor 211.

With the above, since the specific enthalpy Hco at the outlet of the condenser is obtained with Equation (3), the quality xco at the outlet of the condenser can be obtained.

The refrigerant state at the outlet of the condenser is determined as being in a two-phase state when the quality xco at the outlet of the condenser is zero or higher and as being in a liquid state when lower than zero.

With the above, since the method of determining whether the refrigerant state at the outlet of the condenser is in a two-phase state or in a liquid phase state has been set forth, each of the computation method of the mean refrigerant density ρc of the heat source side heat exchanger 3 when the outlet of the condenser is in a two-phase state and when the outlet of the condenser is in a liquid state will be described next.

(Calculation of the Mean Refrigerant Density ρc of the Heat Source Side Heat Exchanger 3 (when the Outlet of the Condenser is in a Two-Phase State))

When the outlet of the condenser is in a two-phase state, the mean refrigerant density ρc is calculated with the following Equation (4) using the refrigerant density of the gas phase region, the refrigerant density of the two-phase region, and the volumetric fraction.

[Math. 4]

$$\rho c = Rcg \times \rho cg + Rcs \times \rho cs \quad (4)$$

Where,

Rcg: volumetric fraction [-] of the gas phase region

Rcs: volumetric fraction [-] of the two-phase region

ρcg: mean refrigerant density [kg/m³] of the gas phase region

ρcs: mean refrigerant density [kg/m³] of the two-phase region

The mean refrigerant density ρcg of the gas phase region of the condenser is a mean value of the density of the inlet of the condenser and the density of the high-pressure saturated gas. The density of the inlet of the condenser is obtained with the detection pressure of the pressure sensor 201 and the detection temperature of the temperature sensor 202, and the density of the high-pressure saturated gas is obtained with the detection pressure of the pressure sensor 201. The mean refrigerant density ρcs of the two-phase region of the condenser can be computed with the following Equation (5) in which the entire two-phase region (quality ranging from xco to 1) is integrated.

[Math. 5]

$$\rho_{cs} = \int_{xco}^{1} [f_g \times \rho_{csg} + (1-f_g) \times \rho_{csl}] dx \quad (5)$$

Where,
x: refrigerant quality [-]
xco: quality [-] at the outlet of the condenser
ρcsg: high-pressure saturated gas density [kg/m³]
ρcsl: high-pressure saturated liquid temperature [° C.]
fg: void fraction [-]

Symbols x and xco can be obtained from the operation data. Symbols pcsg and pcs1 are obtained from the detection pressure of the pressure sensor 201. Regarding the calculation method of fg, many equations have been developed. For example, fg can be obtained from the high-pressure pressure that is a detection pressure of the pressure sensor 201 and the refrigerant quality x.

The computing method of the volumetric fraction of each phase region will be described next. Since the volumetric fraction is expressed as the ratio of the heat transfer area, the following Equation (6) applies.

[Math. 6]

$$Rcg:Rcs = Acg/Ac:Acs/Ac \quad (6)$$

Where,
Acg: heat transfer area [m²] of the gas phase region of the condenser
Acs: heat transfer area [m²] of the two-phase region of the condenser
Ac: heat transfer area [m²] of the condenser Further, owing to the heat balance in each of the gas phase region and the two-phase region, the following Equation (7) applies to each phase region.

[Math. 7]

$$Gr \times \Delta H = A \times K \times \Delta Tm \quad (7)$$

Where,
Gr: discharge flow rate [kg/s] of the compressor
ΔH: specific enthalpy difference [kJ/kg]
A: heat transfer area [m²]
K: overall heat transfer coefficient [kW/(m²° C.)]
ΔTm: mean temperature difference between the refrigerant and air [° C.]

When assuming that the heat flux flowing out in each phase is uniform, then the overall heat transfer coefficient K becomes uniform and the volumetric fraction becomes proportional to the value obtained by dividing the specific enthalpy difference ΔH [kJ/kg] with the temperature difference ΔT [° C.] between the refrigerant and the outdoor air. Accordingly, the following Equation (8) is derived.

[Math. 8]

$$Rcg:Rcs = \Delta Hcg/\Delta Tcg:\Delta Hcs/\Delta Tcs \quad (8)$$

Where,
ΔHcg: specific enthalpy difference [kJ/kg] of the refrigerant in the gas-phase region
ΔHcs: specific enthalpy difference [kJ/kg] of the refrigerant in the two-phase region
ΔTcg: mean temperature difference [° C.] between the refrigerant and the outdoor air in the gas-phase region
ΔTcs: mean temperature difference [° C.] between the refrigerant and the outdoor air in the two-phase region ΔHcg is obtained by subtracting the specific enthalpy of the high-pressure saturated gas from the specific enthalpy at the inlet of the condenser. The specific enthalpy at the inlet of the condenser is obtained with the detection pressure of the pressure sensor 201 and the detection temperature of the temperature sensor 202, and the specific enthalpy of the high-pressure saturated gas is obtained with the detection pressure of the pressure sensor 201. The specific enthalpy difference ΔHcs of the two phase region is obtained by subtracting the specific enthalpy at the outlet of the condenser from the specific enthalpy of the high-pressure saturated gas.

When assuming that there is substantially no air temperature change, the mean temperature difference ΔTcg of the gas phase region is obtained as a log-mean temperature difference using the temperature at the inlet of the condenser, high-pressure saturated gas temperature, and the outside air temperature. The temperature at the inlet of the condenser is the detection temperature of the temperature sensor 202, the high-pressure saturated gas temperature is the saturated gas temperature of the pressure sensor 201, and the outside air temperature is the detection temperature of the temperature sensor 204. Further, the mean temperature difference ΔTcs of the two phase region is obtained as a log-mean temperature difference using the high-pressure saturated gas temperature, the temperature at the outlet of the condenser, and the outside air temperature. The high-pressure saturated liquid temperature is a saturated liquid temperature of the detection pressure of the pressure sensor 201, and the temperature at the outlet of the condenser is obtained by the detection pressure of the pressure sensor 201 and the specific enthalpy at the outlet of the condenser.

With the above, it is possible to calculate the mean refrigerant density ρcg of the gas phase region, the mean refrigerant density ρcs of the two-phase region, and the volumetric fraction (Rcg:Rcs) and, thus, the condenser mean refrigerant density ρc can be calculated in the case in which the outlet of the condenser is in a two-phase state.

(Calculation of the Condenser Mean Refrigerant Density ρc (when the Outlet of the Condenser is in a Liquid Phase State))

Subsequently, the computing method of the mean refrigerant density ρc of the condenser when the outlet of the condenser is in a liquid phase state will be described. When the outlet of the condenser is in a liquid phase state, the mean refrigerant density ρc is calculated with the following Equation (9) using the refrigerant density of the gas phase region, the refrigerant density of the two-phase region, the refrigerant density of the liquid phase region, and the volumetric fraction.

[Math. 9]

$$\rho c = Rcg \times \rho cg + Rcs \times \rho cs + Rcl \times \rho cl \quad (9)$$

Where,
Rcl: volumetric fraction [-] of the liquid phase region
ρcl: mean refrigerant density [kg/m³] of the liquid phase region The computation method of the mean refrigerant density ρcg of the gas phase region is similar to the method when the outlet of the condenser is in a two-phase state. The mean refrigerant density ρcl of the liquid phase region of the condenser is a mean value of the density of the high-pressure saturated liquid and the density of the outlet of the condenser. The high-pressure saturated gas density is obtained by the detection pressure of the pressure sensor 201. The density at the outlet of the condenser is obtained by the specific enthalpy Hco at the outlet of the condenser that has been computed with Equation (3) when computing the quality xco at the outlet of the condenser. The density at the outlet of the condenser may be obtained from the detection temperature of the temperature sensor 203; however, with the above method, it is possible to obtain the outlet state of the condenser including the density at the outlet of the condenser without the temperature sensor 203. The mean refrigerant density ρcs of the two-phase region of the condenser can be computed by integrating the entire two-phase region (quality ranging from 0 to 1).

[Math. 10]

$$\rho_{cs} = \int_0^1 [f_g \times \rho_{csg} + (1-f_g) \times \rho_{csl}] dx \qquad (10)$$

The computing method of the volumetric fraction of each phase will be described next. Since the volumetric fraction is expressed as the ratio of the heat transfer area, the following Equation (11) applies.

[Math. 11]

$$Rcg:Rcs:Rcl = Acg/Ac:Acs/Ac:Acl/Ac \qquad (11)$$

Where,

Acl: heat transfer area [m²] of the liquid phase region of the condenser

Further, owing to the heat balance in each of the gas phase region, the two-phase region, and the liquid phase region, Equation (7) applies to each phase and the following Equation (12) is derived.

[Math. 12]

$$Rcg:Rcs:Rcl = \Delta Hcg/\Delta Tcg:\Delta Hcs/\Delta Tcs:\Delta Hcl/\Delta Tcl \qquad (12)$$

Where,

ΔHcl: specific enthalpy difference [kJ/kg] of the refrigerant in the liquid phase region ΔTcl: mean temperature difference [° C.] between the refrigerant and the outdoor air in the liquid phase region The computation method of the specific enthalpy difference ΔHcg of the gas phase region and that of the mean temperature difference ΔTcg of the gas phase region are similar to the method when the outlet of the condenser is in a two-phase state. The specific enthalpy difference ΔHcs of the two phase region is obtained by subtracting the specific enthalpy of the high-pressure saturated liquid from the specific enthalpy of the high-pressure saturated gas. The specific enthalpy difference ΔHcl of the liquid phase region is obtained by subtracting the specific enthalpy at the outlet of the condenser from the specific enthalpy of the high-pressure saturated liquid. The specific enthalpy of the high-pressure saturated liquid is obtained by the detection pressure of the pressure sensor 201. The specific enthalpy at the outlet of the condenser is Hco that has been computed with Equation (3).

The mean temperature difference ΔTcs of the two phase region is obtained as a log-mean temperature difference using the high-pressure saturated gas temperature, the high-pressure saturated liquid temperature, and the outside air temperature. Further, the mean temperature difference ΔTcl of the liquid phase region is obtained as a log-mean temperature difference using the temperature at the outlet of the condenser, the high-pressure saturated liquid temperature, and the outside air temperature. The temperature at the outlet of the condenser is obtained by the specific enthalpy at the outlet of the condenser, With the above, it is possible to calculate the mean refrigerant density ρcg of the gas phase region, the mean refrigerant density ρcs of the two-phase region, the mean refrigerant density ρcl of the liquid phase region, and the volumetric fraction (Rcg:Rcs:Rcl) and, thus, the condenser mean refrigerant density ρc can be calculated in the case in which the outlet of the condenser is in a liquid phase state.

(Calculation of the Refrigerant Density ρPLm of the High-Pressure Pipe 6)

Subsequently, the computing method of the refrigerant density ρPLm of the high-pressure pipe 6 in Equation (2) will be described. When the refrigerant at the outlet of the condenser is in a two-phase state, the refrigerant state in the high-pressure pipe 6 also becomes a two-phase state. The refrigerant density ρPLm is computed as in the following Equation (13).

[Math. 13]

$$\rho PLm = fg \times \rho csg + (1-fg) \times \rho csl \qquad (13)$$

Regarding the calculation method of the void fraction fg, many equations have been developed. For example, the void fraction fg can be obtained from the high-pressure pressure that is a detection pressure of the pressure sensor 201 and the quality xco at the outlet of the condenser.

On the other hand, when the refrigerant at the outlet of the condenser is in a liquid phase state, the refrigerant state in the high-pressure pipe 6 also becomes a liquid phase state. The refrigerant density ρPLm is obtained by computing Hco as in the following Equation (14).

[Math. 14]

$$\rho PLm = f(Hco) \qquad (14)$$

Here, Hco is the specific enthalpy [kJ/kg] at the outlet of the condenser that has been computed with Equation (3). In the above manner, the mean refrigerant density ρPLm of the high-pressure pipe 6 is obtained.

As above, the calculation method of ρc and ρPLm in Equation (2) has been set forth. Accordingly, it is possible to obtain the internal volume VPLm of the refrigerant extension pipe with Equation (2). As a result, the target refrigerant charge amount MrSTD can be obtained with Equation (1).

(Calculation of an Additional Refrigerant Charge Amount MrADD)

As above, since the target refrigerant charge amount MrSTD can be computed, an additional refrigerant charge amount MrADD can be computed as in the following Equation (15) using an initial refrigerant charge amount Mr1.

[Math. 15]

$$MrADD = MrSTD - Mr1 \qquad (15)$$

Note that if MrADD is a positive value, the MrADD calculated with Equation (15) will be the additional charge amount, and if a negative value, it will be the overcharged amount.

(Limiting the Additional Refrigerant Charge Amount MrADD)

Incidentally, when computing the internal volume VPLm of the high-pressure pipe 6 that is a liquid side refrigerant extension pipe, it is assumed that the refrigerant charge amount is equal to the total value of the amount of refrigerant in the heat source side heat exchanger 3 and the amount of refrigerant in the high-pressure pipe 6. Further, it is assumed that the refrigerant amount except for that in the heat source side heat exchanger 3 is the refrigerant amount of the high-pressure pipe 6. However, if the initial refrigerant charge amount is small, the refrigerant quality at the outlet of the condenser, that is, the refrigerant quality in the high-pressure pipe 6, becomes high. As such, since it will be in a two-phase state with high gas rate, the refrigerant density ρPLm becomes low. As a result, the internal volume VPLm of the high-pressure pipe 6 is calculated larger than its actual volume, and the target refrigerant charge amount MrSTD in Equation (1) and the additional refrigerant charge amount MrADD in Equation (15) are calculated in excess.

As above, if the additional refrigerant charge amount MrADD that has been calculated in excess is displayed in step S8 of FIG. 3 as it is, and if the additional refrigerant charge amount MrADD is charged, then, there is a possibility of overcharge. Accordingly, if the refrigerant density ρPLm in the high-pressure pipe 6 changes due to charge of refrigerant, there exists a need to provide a limit to the display of the additional refrigerant charge amount MrADD in step S8 of FIG. 3.

Figure 7:
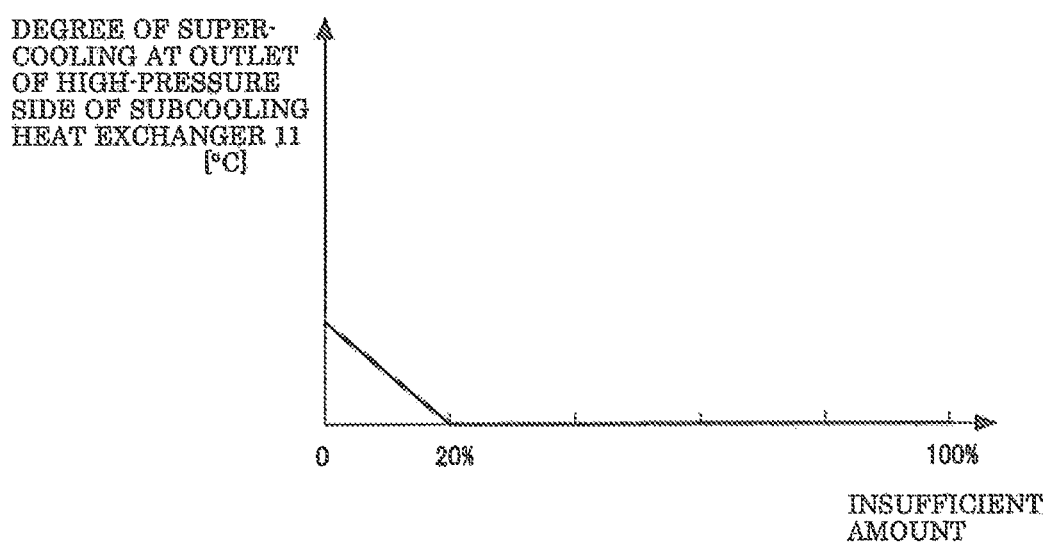
FIG. 7 is a diagram illustrating the change in the subcooling at an outlet of a high-pressure side of a subcooling heat exchanger 11 with respect to the refrigerant charge amount to the air-conditioning apparatus 100 of the first exemplary embodiment of the present disclosure.

FIG. 7 is a diagram illustrating the change in the subcooling at the outlet of the high-pressure side of the subcooling heat exchanger 11 relative to the insufficient refrigerant amount of the air-conditioning apparatus 100 of the first exemplary embodiment of the present disclosure. In FIG. 7, the horizontal axis is the insufficient amount and the vertical axis is the subcooling at the outlet of the high-pressure side of the subcooling heat exchanger 11. Note that the subcooling at the outlet of the high-pressure side of the subcooling heat exchanger 11 is a value obtained by subtracting a detection temperature of the temperature sensor 207 from the saturation temperature of a detection pressure of the pressure sensor 206. As shown in FIG. 7, it has been confirmed from experiment results and through simulations that when the insufficient amount is zero percent (in a state in which the target charge amount is charged), subcooling is obtained, and when the insufficient amount is over 20%, no subcooling is obtained. That is, it is when the insufficient amount of the charged refrigerant amount is 20% or less than the target refrigerant charge amount MrSTD that the subcooling at the outlet of the high-pressure side of the subcooling heat exchanger 11 becomes larger than zero. In other words, when the refrigerant charge amount is less than 80% of the target refrigerant charge amount MrSTD, there will be no subcooling at the outlet of the high-pressure side of the subcooling heat exchanger 11 and the refrigerant at the outlet of the high-pressure side of the subcooling heat exchanger will be a two-phase refrigerant.

In the first exemplary embodiment, since computation of the additional refrigerant charge amount MrADD is carried out assuming that the refrigerant at the outlet of the high-pressure side of the subcooling heat exchanger 11 is a liquid refrigerant, the computation precision of the additional refrigerant charge amount MrADD is degraded when the refrigerant charge amount is insufficient by more than 20% turning the refrigerant at the outlet of the high-pressure side of the subcooling heat exchanger 11 into liquid. That is, when the refrigerant at the outlet of the high-pressure side of the subcooling heat exchanger 11 is a two-phase refrigerant, the subcooling at the outlet of the subcooling heat exchanger 11 is zero. In such a case in which the subcooling is zero, in computing the additional refrigerant charge amount MrADD, it is assumed that the refrigerant at the outlet of the high-pressure side of the subcooling heat exchanger 11 is in a saturated liquid state; accordingly, the computation precision of the additional refrigerant charge amount MrADD is degraded.

Accordingly, in the first exemplary embodiment, regarding the computation of the target refrigerant charge amount, it can be understood that the upper limit of the insufficient amount of a single refrigerant charge amount is 20%. Accordingly, the additional refrigerant charge amount of a single charge is set to 20% or less than the target refrigerant charge amount MrSTD. For example, when the target refrigerant charge amount MrSTD is 40 kg, the upper limit of the additional refrigerant charge amount is 8 kg. Note that although the upper limit of the additional refrigerant charge amount is set to 20% of the target refrigerant charge amount, the point is that it may be any predetermined percentage that determines whether subcooling will be obtained between the heat source side heat exchanger 3 and the use side pressure reduction mechanisms 14a and 14b.

Similar to the example cited in the description of the flowchart in FIG. 3, a description will be given assuming that 40 kg is computed in the first computation of the target refrigerant charge amount MrSTD and 10 kg is computed in the first computation of the additional refrigerant charge amount. As such, the computed additional refrigerant charge amount exceeds the upper limit of 8 kg. That is, at the time when computing of the additional refrigerant charge amount is carried out for the first time, the charged amount of refrigerant at this time will be insufficient by more than 20% relative to the target refrigerant charge amount MrSTD.

Accordingly, when the initial refrigerant charge amount is insufficient as above, there is a possibility that the 10 kg obtained by calculation of the additional refrigerant charge amount for the first time may be more than the actually required amount. Therefore, the additional refrigerant charge amount is not displayed as 10 kg but is displayed as 8 kg. With the above, it is possible to prevent overcharging of the refrigerant.

As above, even when the computation precision of the first time is low, when computing the target refrigerant charge amount MrSTD for the second time, since 8 kg of refrigerant has been additionally charged already, the insufficient amount of the refrigerant charge amount for the second time, at present, is less than 20%. Accordingly, it is possible to compute the target refrigerant charge amount MrSTD with high precision, as well as computing the additional refrigerant charge amount MrADD with high precision. The computation precision is therefore increased as the number of charging increases; hence, in the last charging, additional charging is carried out on the basis of the additional refrigerant charge amount MrADD that has been obtained with sufficient precision.

Note that a case in which the charged amount of refrigerant is insufficient has been described herein; however, when in an overcharged state, as described above, the value calculated with Equation (15) will be a negative value. When in an overcharged state, the subcooling is zero or higher. As such, the limiting display described above is unnecessary when the charged amount is insufficient, and it is only required to display the overcharged amount calculated with Equation (15). That is, when MrADD=−10 is calculated, "overcharged amount 10 kg" may be displayed.

(Using the Detection Values of Each of the Temperature Sensors 203 and 214 Provided on the Corresponding Upstream Side and the Downstream Side of the Liquid Side Refrigerant Extension Pipe)

Here, when the outside air temperature is low, the refrigerant of the high-pressure pipe 6 that is a liquid side refrigerant extension pipe is cooled by the outside air. In this case, a phenomenon occurs such as the refrigerant that has been in a two-phase state on the upstream side of the high-pressure pipe 6 turns into a liquid state on the downstream side or the density of the refrigerant that is in a liquid phase on both the upstream side and the downstream side becomes high on the downstream side. In this case, it will be possible to detect the change in the refrigerant state in the liquid side refrigerant extension pipe if a temperature sensor is provided on each of the upstream side and the downstream side of the liquid side refrigerant extension pipe. Accordingly, by using the detection value of each temperature sensor provided on the upstream side and the downstream side of the liquid side refrigerant extension pipe, the computing precision of the refrigerant density ρPLm of the liquid side refrigerant extension pipe is improved. Therefore, the computing precision of the internal volume VPLm of the liquid side refrigerant extension pipe in Equation (2) is improved. Here, the temperature sensor 203 functions as a temperature detection means on the upstream side of the liquid side refrigerant extension pipe and the temperature sensor 214 functions as a temperature detection means on the downstream side of the liquid side refrigerant extension pipe.

It is determined that the refrigerant that had been a two-phase refrigerant on the upstream side of the high-pressure pipe 6 has turned into a liquid refrigerant on the downstream side when the detection temperature of the temperature sensor 203 and the saturation temperature of the detection pressure of the pressure sensor 201 are substantially the same and when the detection temperature of the temperature sensor 214 is a predetermined value (2° C., for example) or lower than the detection temperature of the temperature sensor 203. Further, it is determined that the liquid phase refrigerant on the upstream side of the high-pressure pipe 6 has been cooled before reaching the downstream side when the detection temperature of the temperature sensor 203 is a predetermined value (2° C., for example) or lower than the saturation temperature of the detection pressure of the pressure sensor 201 and when the detection temperature of the temperature sensor 203 is a predetermined value (2° C., for example) or lower than the detection temperature of the temperature sensor 213. As above, by taking the change in the refrigerant state in the high-pressure pipe 6 into consideration, it is possible to compute the refrigerant density ρPLm in the liquid side refrigerant extension pipe (high-pressure pipe 6) with a further higher precision.

Advantageous Effects

As described above, in the first exemplary embodiment, the internal volume VPLm of the liquid side refrigerant extension pipe is obtained from the initial refrigerant charge amount and the operation data of the air-conditioning apparatus 100. The target refrigerant charge amount MrSTD and the additional refrigerant charge amount MrADD are computed with the internal volume VPLm of the liquid side refrigerant extension pipe and the standard operation data, and the additional refrigerant charge amount is displayed. With the above, after completion of the installation work of the air-conditioning apparatus 100, the worker may activate the refrigerant charge assisting program and carry out the refrigerant charge amount detection operation mode and know the additional refrigerant charge amount MrADD, and, thus, carry out the charging work easily.

Further, since the additional refrigerant charge amount MrADD is computed using the standard operation data, it is possible to compute the additional refrigerant charge amount MrADD that is required in achieving an adequate operation state. Moreover, the assumed standard operation state is an operating state that meets the condition when the unit performance was measured during unit development or the test condition of when the refrigerant amount of the unit was determined, such as, for example, an operating condition satisfying the cooling standard condition of JIS, and is an operating state that meets a condition such as the low pressure or the high pressure being high, requiring a larger amount of refrigerant, such as the condition in which the outside air temperature and the indoor temperature are higher than the cooling standard condition of JIS. Accordingly, the charge amount will not be computed on the insufficient side and it will be possible to compute the target refrigerant charge amount MrSTD that achieves a state allowing normal operation to be carried out without any problem. Thus, by carrying out charge of refrigerant with the method of the first exemplary embodiment, it is possible to prevent trouble from occurring such as, for example, non-cooling due to insufficient amount of refrigerant during the cooling season in the summer.

Further, in the refrigerant charge amount detection operation mode, the operating frequency of the compressor 1 and the rotation speed of the heat source side fan 4 are actively controlled to actively create an operating state suitable for calculating the target refrigerant charge amount MrSTD. Accordingly, it is possible to perform computation with high precision and in a short time compared to the method in which the refrigerant charge amount and the pipe internal volume are calculated on the basis of the operation data obtained at appropriate timings while in normal operation.

Further, in the computation of the target refrigerant charge amount, computation of the refrigerant amount in the use units 303a and 303b is not required and only the computation of the refrigerant amount in the liquid side refrigerant extension pipe (high-pressure pipe 6) and the condenser (heat source side heat exchanger 3) is performed. Accordingly, it is possible to determine the target refrigerant charge amount MrSTD with only the specification of the heat source unit 301. Thus, the present technique can be applied generally to a heat source unit 301 that is connected to use units 303a and 303b with all kinds of specifications.

Further, even in a case in which an air-conditioning apparatus 100 is installed in a building or apartment by using existing pipes and in which the pipe length is unknown, computation of the target refrigerant charge amount MrSTD and the additional refrigerant charge amount MrADD can be accurately performed.

Further, in the first exemplary embodiment, in a case in which a worker manually performs charging with a refrigerant cylinder as well, since the absolute amount of the additional refrigerant charge amount to approach the target refrigerant charge amount MrSTD is displayed, it is possible to achieve the appropriate refrigerant charge amount with fewer number of additional charging, and, thus, work efficiency is markedly improved. That is, the first exemplary embodiment allows the displayed additional refrigerant charge amount to be charged with the refrigerant cylinder all at once. Accordingly, the number of additional charging can be reduced without the need to charge the refrigerant in small quantities while checking the operating state as is the case with conventional methods.

First Exemplary Modification

In the first exemplary embodiment, the refrigerant charge amount detection operation mode is carried out with the refrigerant flow of the cooling only operation mode that is a normal operation mode requiring the largest amount of refrigerant. However, it will be possible to acquire the amount of liquid refrigerant in the accumulator 19 during the refrigerant charge amount detection operation mode if a liquid surface detection sensor, which detects the liquid surface, is mounted to the accumulator 19, which is a liquid reservoir, to detect the amount of liquid refrigerant in the accumulator 19 during normal operation. Accordingly, if a liquid surface detection sensor is mounted, it will be possible to apply the first exemplary embodiment and to carry out refrigerant charge amount detection even to operation modes in which liquid refrigerant is accumulated in the liquid reservoir, such as the heating only operation mode, the cooling main operation mode, and the heating main operation mode. In such a case, Equation (1) and Equation (2) is built on the assumption that the great majority of the refrigerant amount exists in the condenser, the liquid side refrigerant extension pipe (high-pressure pipe 6), and the liquid reservoir (accumulator 19) and computation of the refrigerant amount in the liquid reservoir is additionally performed. Then, the internal volume VPLm of the liquid side refrigerant extension pipe and the target refrigerant charge amount MrSTD may be obtained.

Second Exemplary Modification

In the above description, when obtaining the target refrigerant charge amount MrSTD, the refrigerant amount of the high-pressure pipe 6 is obtained as the refrigerant amount (VPLm×ρPLmSTD) of the liquid side refrigerant extension pipe; however, in place of the refrigerant amount of the high-pressure pipe 6, the refrigerant amount inside the indoor liquid branch pipes 13a and 13b may be obtained. The pipe internal volume of the indoor liquid branch pipes 13a and 13b may be obtained by replacing, in Equation (2), ρPLm with the refrigerant density of the indoor liquid branch pipes 13a and 13b and VPLm with the internal volume of the indoor liquid branch pipes 13a and 13b.

Since the indoor liquid branch pipes 13a and 13b are positioned on the downstream side of the subcooling heat exchanger 11, even if the refrigerant charge amount is insufficient and the refrigerant at the outlet of the heat source side heat exchanger 3 is in a two-phase state, there will be liquid refrigerant in the indoor liquid branch pipes 13a and 13b. Accordingly, the refrigerant density in the indoor liquid branch pipes 13a and 13b is substantially uniform even with the change in the refrigerant charge amount or in the operation data. As a result, the amount corresponding to the insufficient refrigerant amount of the heat source side heat exchanger 3 is computed and displayed as the additional refrigerant charge amount MrADD. With the calculation method of this second exemplary modification, since the amount corresponding to the insufficient refrigerant in the high-pressure pipe 6 is not taken into consideration, the number of additional refrigerant charging work increases; however, there will be no overcharging even if the upper limit of the additional refrigerant charge amount is not set.

<Computing of Target Refrigerant Charge Amount MrSTD (Computing Method 2)>

In the previous computation, it has been assumed that the great majority of the refrigerant exists in the heat source side heat exchanger 3 and the high-pressure pipe 6; however, in actuality, the refrigerant also exists in other pipes. Specifically, the indoor liquid branch pipes 13a and 13b that are liquid side refrigerant extending branch pipes may be understood as portions in which a large amount of refrigerant exist because they are portions where liquid refrigerant with high refrigerant density flows therein. Further, the pipes connecting the relay unit 302 and the use units 303a and 303b may be understood as portions in which a large amount of refrigerant exist since their internal volumes are large. Accordingly, it is possible to obtain the target refrigerant charge amount MrSTD with a further higher precision by taking into consideration both of the refrigerant amount in the high-pressure pipe 6, which is a liquid side refrigerant extension pipe, and the refrigerant amount in the indoor liquid branch pipes 13a and 13b, which are liquid side refrigerant extending branch pipes.

Figure 8:
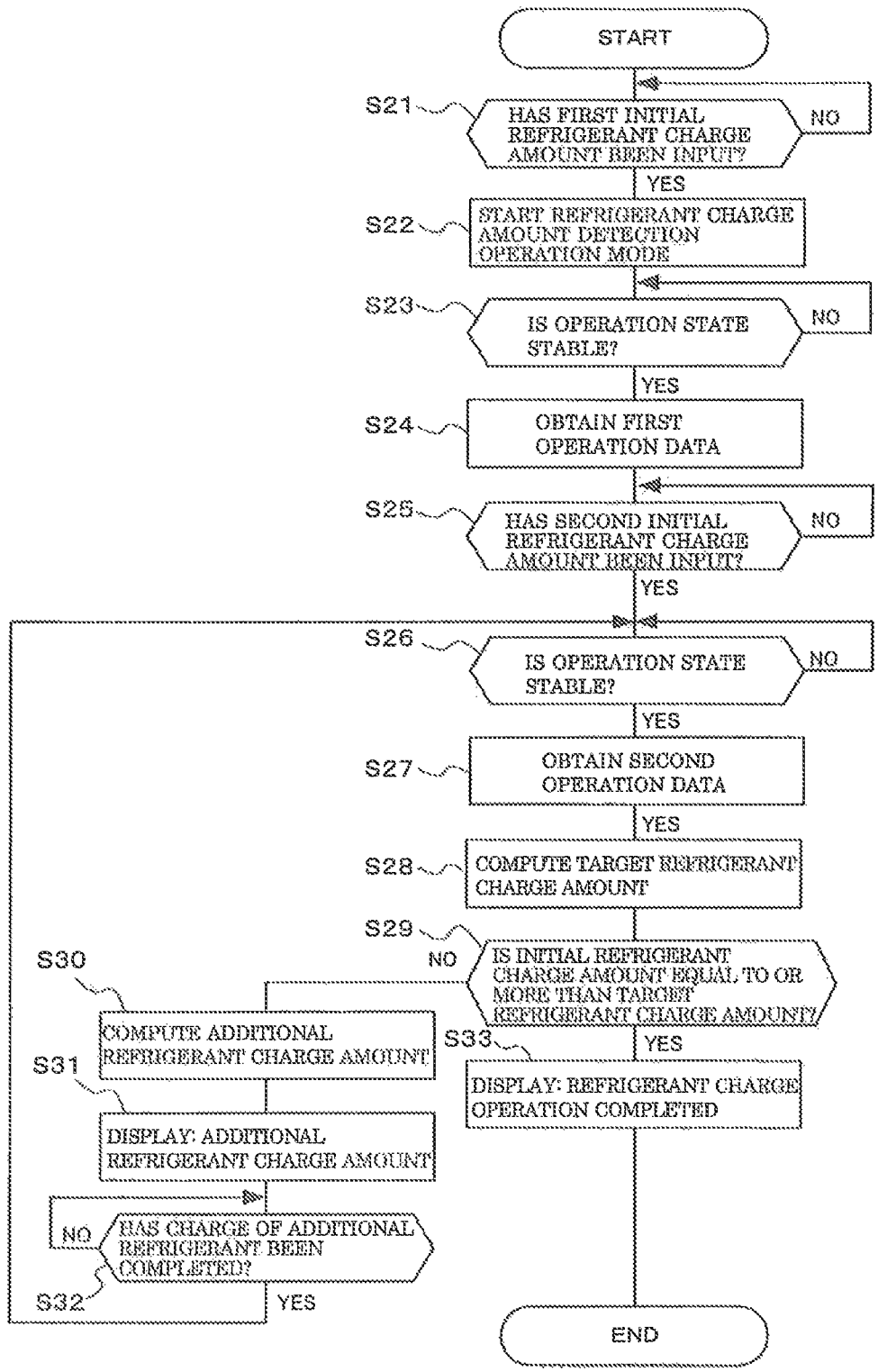
FIG. 8 is a flowchart illustrating a refrigerant charge amount determination process in which computation (computation method 2) of the target refrigerant charge amount is applied to the refrigerant charge assisting device 121 according to the first exemplary embodiment of the present disclosure.

FIG. 8 is a flowchart illustrating the refrigerant charge amount determination operation in which computation (computation method 2) of the target refrigerant charge amount is applied to the refrigerant charge assisting device 121 according to the first exemplary embodiment of the present disclosure.

First, as a preliminary stage, the worker carries out initial charging of the refrigerant to the amount that allows a trial run to be conducted. Subsequently, the worker operates the input unit 122 to activate the refrigerant charge assisting program. With this, the process in the flowchart illustrated in FIG. 3 is started.

The refrigerant charge assisting device 121 displays a display on the display unit 127 encouraging input of a first initial refrigerant charge amount. According to the display, when the initial refrigerant charge amount is input (S21), the refrigerant charge amount detection operation mode is started (S22). Note that the "first initial refrigerant charge amount" is a total value of the refrigerant amount that has been charged in step S21 and the refrigerant amount that has been filled in the heat source unit 301 in advance.

The refrigerant charge assisting device 121 commands the unit controlling device 101 to make the refrigerant circuit start the refrigerant charge amount detection operation mode and when the operating state becomes stable after elapse of a predetermined time (S23), acquires the operation data (a first operation data indicating a first operating state) (S24). Note that the operation method of the refrigerant charge amount detection operation mode is similar to that described in FIG. 3 in the first exemplary embodiment.

Next, the refrigerant charge assisting device 121 displays a display encouraging initial charging of the refrigerant for the second time and when the initial charging of the refrigerant is carried out for the second time, displays a display on the display unit 127 encouraging input of a second initial refrigerant charge amount. Then, when the worker inputs the second initial refrigerant charge amount (S25), the refrigerant charge assisting device 121 stands by for the operating state to become stable. Note that the "second initial refrigerant charge amount" is the value of the charged refrigerant amount in the above-described second initial charging of the refrigerant. When the refrigerant charge assisting device 121 determines that the operating state has become stable (S26), the operation data (a second operation data indicating a second operating state) is acquired once more (S27). The reason for dividing the initial charge of the refrigerant into two and performing them as above will be described in detail below, but it should me mentioned that it is performed with and intention to obtain two sets of operation data.

Next, the refrigerant charge assisting device 121 computes the target refrigerant charge amount MrSTD from the first operation data, the second operation data, the first initial refrigerant charge amount, and the second initial refrigerant charge amount (S28). This computing method of the target refrigerant charge amount MrSTD will be described later. After that, if the initial refrigerant charge amount is smaller than the target refrigerant charge amount MrSTD (S29), the refrigerant charge assisting device 121 computes the additional refrigerant charge amount (S30) and displays the computed additional refrigerant charge amount on the display unit 127 (S31). Similar to the display described in step S8 of FIG. 3, this display may be displayed with an upper limit of 20% of the target refrigerant charge amount MrSTD, or in a case in which the second exemplary modification above is applied, the computed additional refrigerant charge amount may be displayed as it is.

Finally, when it is detected that the displayed amount has been additionally charged by the worker who has confirmed this display (S32), the refrigerant charge assisting device 121 returns to step S26 and repeats a similar process. Note that when returning to S26 once more, computation is carried out while the latest operation data is designated as the second operation data and the operation data obtained before the additional charge is designated as the first operation data, and, further, the second initial refrigerant charge amount is designated as the additional refrigerant charge amount and the first initial refrigerant charge amount is designated as the total refrigerant charge amount of the units before the additional charge.

On the other hand, when the initial refrigerant charge amount is equivalent to or more than the target refrigerant charge amount MrSTD (S29), the refrigerant charge assisting device 121 determines that the charged amount is not insufficient, displays the end of the refrigerant charging work on the display unit 127 (S33), and ends the refrigerant charge assisting program along with the refrigerant charge amount detection operation mode.

(Computing Method of the Target Refrigerant Charge Amount MrSTD)

Description will be given below of the computing method of the target refrigerant charge amount MrSTD in step S28. First, the internal volume of each of the refrigerant extension pipe and the refrigerant extending branch pipes is computed. Assuming that the greater part of the charged refrigerant is in the condenser, the liquid side refrigerant extension pipe, and the liquid side refrigerant extending branch pipes, then, from the first operation data and the first initial refrigerant charge amount, the following Equation (16) applies.

[Math. 16]

$$Vc \times \rho c1 + VPLm \times \rho PLm1 + VPLs \times \rho PLs1 = Mr1 \qquad (16)$$

Where, $\rho c1$: mean refrigerant density [kg/m$^3$] of the heat source side heat exchanger 3 during the first operating state $\rho PLm1$: refrigerant density [kg/m$^3$] of the high-pressure pipe 6 during the first operating state VPLs: internal volume [m$^3$] of the indoor liquid branch pipes 13$a$ and 13$b$ that are liquid side refrigerant extending branch pipes.

$\rho PLs1$: refrigerant density [kg/m$^3$] of the indoor liquid branch pipes 13$a$ and 13$b$ Mr1: first initial refrigerant charge amount [kg]

The computing method of $\rho c1$ is the same as that of the previous mean refrigerant density $\rho c$ of the compressor. The computing method of $\rho PLm1$ is similar to that of the previous $\rho PLm$. Since the indoor liquid branch pipes 13$a$ and 13$b$ are positioned on the downstream side of the subcooling heat exchanger 11, it is assumed that liquid refrigerant is flowing in the indoor liquid branch pipes 13$a$ and 13$b$, and $\rho PLs1$ is obtained by the detection temperature of the temperature sensor 207. Mr1 is an input value.

Further, from the second operation data and the second initial refrigerant charge amount, the following Equation (17) applies.

[Math. 17]

$$Vc \times \rho c2 + VPLm \times \rho PLm2 + VPLs \times \rho PLs2 = Mr1 + Mr2 \qquad (17)$$

Where, $\rho c2$: mean refrigerant density [kg/m$^3$] of the heat source side heat exchanger 3 during the second operating state $\rho PLm2$: refrigerant density [kg/m$^3$] of the high-pressure pipe 6 during the second operating state $\rho PLs2$: refrigerant density [kg/m$^3$] of the indoor liquid branch pipes 13$a$ and 13$b$ Mr2: second initial refrigerant charge amount [kg]

The computing method of $\rho c2$ is the same as that of the previous mean refrigerant density $\rho c$ of the compressor. The computing method of $\rho PLm2$ is similar to that of the previous $\rho PLm$. $\rho PLs2$ is obtained by the detection temperature of the temperature sensor 207.

Since the unknown quantities in Equation (16) and Equation (17) are only the internal volume VPLm of the high-pressure pipe and the internal volume VPLs of the indoor liquid branch pipes 13$a$ and 13$b$, VPLm and VPLs can be obtained by solving the simultaneous equations of Equation (16) and Equation (17).

Next, the refrigerant amount during the standard operating state is computed and the target refrigerant charge amount MrSTD is obtained.

[Math. 18]

$$Vc \times \rho cSTD + VPLm \times \rho PLmSTD + VPLs \times \rho PLsSTD = MrSTD \qquad (18)$$

Where, $\rho PLsSTD$ is the indoor liquid branch pipe density [kg/m$^3$] during the standard operating state and can be obtained with the detection temperature of the temperature sensor 207. As such, the additional refrigerant charge amount MrADD [kg] can be obtained with the following Equation (19).

[Math. 19]

$$MrADD = MrSTD - Mr1 - Mr2 \qquad (19)$$

As above, since the target refrigerant charge amount MrSTD is calculated while the refrigerant amount in the indoor liquid branch pipes 13$a$ and 13$b$ is taken into consideration, compared with the computation in which a single pipe portion in the high-pressure pipe 6 is used, the target refrigerant charge amount MrSTD can be obtained with higher precision. Note that it will be possible to use a method similar to that of the first exemplary embodiment to a case in which there are three more liquid side refrigerant pipes in the air-conditioning apparatus by obtaining the same number of combinations of the initial refrigerant charge amount and the operation data at that time as that of the liquid side refrigerant pipes, and thus the target refrigerant charge amount MrSTD can be obtained with high precision.

Second Exemplary Embodiment

In the first exemplary embodiment described above, description has been given of a configuration in which the present disclosure is applied to a refrigerant circuit that is provided with a relay unit 302 and that is capable of performing a simultaneous cooling and heating operation (a cooling and heating mixed operation), which can perform a cooling or heating operation in each of the use units 303$a$ and 303$b$. In the second exemplary embodiment, a configuration is set forth in which the present disclosure is applied to a different refrigerant circuit.

<Configuration of Components>

Figure 9:
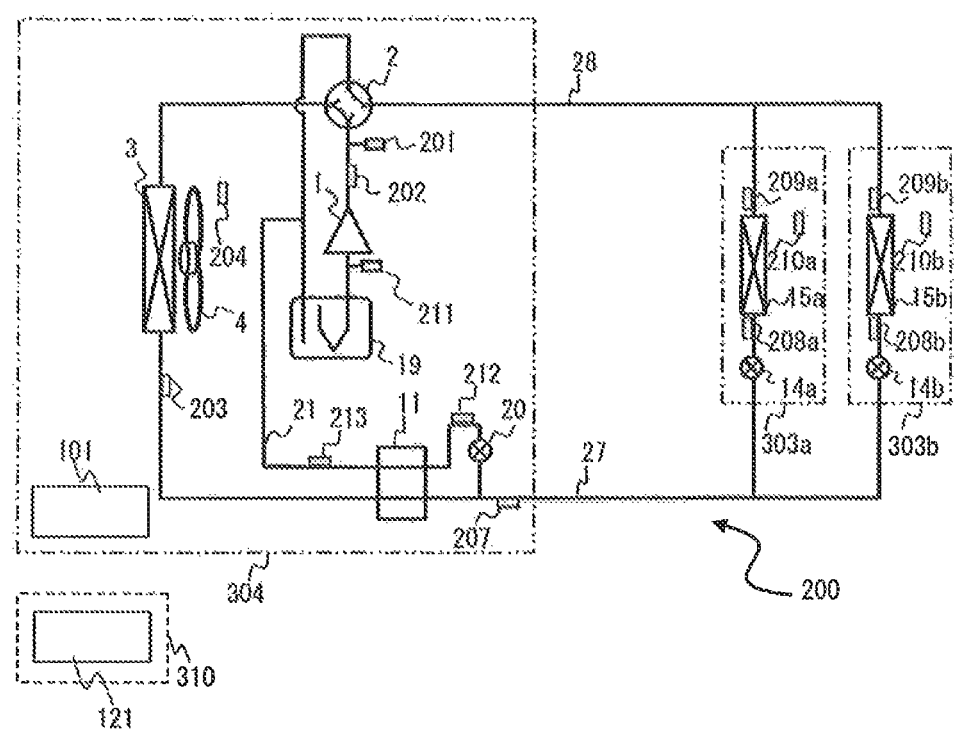
FIG. 9 is a refrigerant circuit diagram illustrating an air-conditioning apparatus 200 according to the second exemplary embodiment of the present disclosure.

FIG. 9 is a refrigerant circuit diagram illustrating an air-conditioning apparatus 200 according to the second exemplary embodiment of the present disclosure.

The air-conditioning apparatus 200 is capable of processing a cooling command (cooling ON/OFF) or a heating command (heating ON/OFF) that has been selected in use units 303a and 303b and thus is capable of carrying out cooling or heating. The same components as those in the first exemplary embodiment are designated by the same reference numerals. The difference between the first exemplary embodiment will be mainly described.

In the air-conditioning apparatus 200 according to the second exemplary embodiment, a heat source unit 304 and the use units 303a and 303b are connected by a liquid pipe 27 and a gas pipe 28 that are refrigerant pipes.

<Heat Source Unit 304>

The heat source unit 304 includes a compressor 1, a four-way valve 2, a heat source side heat exchanger 3, a heat source side fan 4, a subcooling heat exchanger 11, an accumulator 19, a bypass pressure reduction mechanism 20, and a pipe 21. The characteristic of each device is similar to that of the first exemplary embodiment above. In the heat source unit 304, a pressure sensor 201 is provided on the discharge side of the compressor 1 and a pressure sensor 211 is provided on the suction side of the compressor 1, each measuring the refrigerant pressure at their disposed positions. Further, a temperature sensor 202 is provided on the discharge side of the compressor 1, a temperature sensor 203 is provided on the liquid side of the heat source side heat exchanger 3, and a temperature sensor 207 is provided between the high-pressure side of the subcooling heat exchanger 11 and indoor liquid pipes, each detecting the refrigerant temperature at their disposed positions. Further, a temperature sensor 212 is provided between the bypass pressure reduction mechanism 20 and the low-pressure side of the subcooling heat exchanger 11 and a temperature sensor 213 is provided at the outlet of the low-pressure side of the subcooling heat exchanger 11, each measuring the refrigerant temperature at their disposed positions. Furthermore, a temperature sensor 204 is provided in the air inlet port and measures the outside air temperature.

<Normal Operation Mode>

The air-conditioning apparatus 200 controls each device that is mounted in the heat source unit 301 and the use units 303a and 303b on the basis of the air conditioning command requested in the use units 303a and 303b and is capable of performing, for example, a cooling only operation mode and a heating only operation mode. Next, description will be given on each of the normal operation modes.

(Cooling Only Operation Mode)

In the cooling only operation mode, the four-way valve 2 is switched to the solid line side in FIG. 9 such that the discharge side of the compressor 1 is connected to the gas side of the heat source side heat exchanger 3 and the suction side of the compressor 1 is connected to the gas pipe 28.

A high-temperature high-pressure gas refrigerant discharged from the compressor 1 flows into the heat source side heat exchanger 3 through the four-way valve 2 and rejects heat to the outdoor air that has been sent from the heat source side fan 4. The refrigerant that has rejected heat to the outdoor air flows out of the heat source side heat exchanger 3 and flows into the subcooling heat exchanger 11. In the subcooling heat exchanger 11, heat is exchanged between a high-pressure refrigerant that has flowed out of the heat source side heat exchanger 3 and a low-pressure refrigerant, which is a portion of the refrigerant that has passed through the subcooling heat exchanger 11, that has been decompressed in the bypass pressure reduction mechanism 20 and that has flowed into the subcooling heat exchanger 11.

The high-pressure refrigerant that has flowed out of the subcooling heat exchanger 11 is divided into a refrigerant that flows in the liquid pipe 27 and a refrigerant that flows in the bypass pressure reduction mechanism 20. The refrigerant that has flowed into the liquid pipe 27 is decompressed in use side pressure reduction mechanisms 14a and 14b and turns into a low-pressure two-phase refrigerant. The refrigerant turns into a low-pressure gas refrigerant after cooling the indoor air in the use side heat exchangers 15a and 15b. After passing through the gas pipe 28 and the four-way valve 2, this low-pressure gas refrigerant merges with the refrigerant that has been decompressed in the bypass pressure reduction mechanism 20 and that has exchanged heat with the high-pressure refrigerant in the subcooling heat exchanger 11 and is suctioned into the compressor 1 again via the accumulator 19.

(Heating Only Operation Mode)

In the heating only operation mode, the four-way valve 2 is switched to the broken line side in FIG. 9 such that the discharge side of the compressor 1 is connected to the gas pipe 28 and the suction side of the compressor 1 is connected to the gas side of the heat source side heat exchanger 3. Further, the bypass pressure reduction mechanism 20 is totally closed.

The high-temperature high-pressure gas refrigerant discharged from the compressor 1 flows into the gas pipe 28 via the four-way valve 2 and turns into a high-pressure liquid refrigerant after heating the indoor air in the use side heat exchangers 15a and 15b. This high-pressure liquid refrigerant is decompressed in the use side pressure reduction mechanisms 14a and 14b, turns into a low-pressure two-phase refrigerant, and passes through the liquid pipe 27 and the subcooling heat exchanger 11. After passing through the subcooling heat exchanger 11, the refrigerant removes heat from the outdoor air in the heat source side heat exchanger 3, turns into a low-pressure gas refrigerant, and is suctioned into the compressor once more after passing through the accumulator 19 via the four-way valve 2.

<Refrigerant Charge Amount Detection Operation Mode>

Similar to the air-conditioning apparatus 100 of the first exemplary embodiment, the air-conditioning apparatus 200 is also capable of performing the refrigerant charge amount detection operation mode based on the flowchart illustrated in FIG. 3. Further, similar to the air-conditioning apparatus 100 of the first exemplary embodiment, in the refrigerant charge amount detection operation mode, the air-conditioning apparatus 200 performs operation in the normal operation mode requiring the largest amount of refrigerant. That is, in the refrigerant charge amount detection operation mode, the heat source side heat exchanger 3 becomes a condenser and the flowing state of the refrigerant becomes that of the cooling only operation mode such that the high-pressure liquid refrigerant flows in the liquid pipe 27. In step S3 of the refrigerant charge amount detection operation mode, the control method of the compressor 1, the heat source side fan 4, the bypass pressure reduction mechanism 20, the use side pressure reduction mechanisms 14a and 14b are similar to that of the first exemplary embodiment.

In the air-conditioning apparatus 100 of the first exemplary embodiment, the pipes on the liquid side that connect the heat source unit 301 and the use units 303a and 303b are two, namely, the high-pressure pipe 6 and the indoor liquid branch pipes 13a and 13b, and during the refrigerant charge amount detection operation mode, the high-pressure pipe 6 is positioned on the upstream side of the subcooling heat exchanger 11. Conversely, in the air-conditioning apparatus 200, the extension pipe that connects the heat source unit 304 and the use units 303a and 303b is the liquid pipe 27 alone, and during the refrigerant charge amount detection operation mode, the liquid pipe 27 is positioned on the downstream side of the subcooling heat exchanger 11. Even with the above device configuration, computation of the target refrigerant charge amount MrSTD can be carried out in a similar manner to that of the first exemplary embodiment.

That is, in the subcooling heat exchanger 11, from the relationship that the amount of heat discharged from the high-pressure refrigerant and the amount of heat absorbed by the low-pressure refrigerant are equivalent, the outlet specific enthalpy Hco and the outlet quality xco of the heat source side heat exchanger 3, serving as a condenser, can be obtained with Equation (3). Note that in the second exemplary embodiment, no subcooling heat exchanger 9 is provided and, as such, the Hho in Equation (3) is the specific enthalpy at the outlet of the low-pressure side of the subcooling heat exchanger 11.

Accordingly, it is possible to obtain the mean refrigerant density ρc of the condenser. Further, since the liquid pipe 27, which is a liquid side refrigerant extension pipe, is positioned on the downstream side of the subcooling heat exchanger 11, the refrigerant therein is a high-pressure liquid refrigerant. Accordingly, it is possible to obtain the refrigerant density ρPLm of the liquid pipe 27 from the detection temperature of the temperature sensor 207. Therefore, by using the initial refrigerant charge amount Mr1, the internal volume VPLm of the liquid pipe 27 is obtained with Equation (2). Moreover, by performing computation of the refrigerant amount in the condenser and the liquid side refrigerant extension pipe during the standard operating state, the target refrigerant charge amount MrSTD is obtained, and it will be possible to obtain the additional refrigerant charge amount MrADD.

As set forth above, in the air-conditioning apparatus 200 as well, with the application of the first exemplary embodiment, the internal volume VPLm of the liquid pipe 27 that is a liquid side refrigerant extension pipe is obtained with the initial refrigerant charge amount, and it is possible to precisely obtain the target refrigerant charge amount MrSTD and the additional refrigerant charge amount MrADD. Further, similar to the air-conditioning apparatus 100, in the air-conditioning apparatus 200, the subcooling heat exchanger is disposed on the downstream side of the heat source side heat exchanger 3. Accordingly, even if the downstream side of the heat source side heat exchanger 3 is in a two-phase state due to insufficient amount of refrigerant, it is possible to obtain the outlet state of the heat source side heat exchanger 3 from the subcooling at the outlet of the high-pressure side of the subcooling heat exchanger 11. Therefore, in the air-conditioning apparatus 200 as well, it is possible to calculate the additional refrigerant charge amount MrADD with high precision with the application of the calculation method of the additional refrigerant charge amount described in the first exemplary embodiment.

Note that in the first and second exemplary embodiments above, examples has been set forth of a case in which the present disclosure is applied to a refrigerant circuit provided with a subcooling heat exchanger; however, not limited to this, the present disclosure can be applied to a refrigerant circuit that is provided with no subcooling heat exchanger.

Further, although in the first and second exemplary embodiments above, a system in which the refrigerant charge assisting program is installed in an external controller 320 that is separate from the air-conditioning apparatus 100, 200 has been described, the present disclosure is not limited to this system. That is, the program may be installed in a unit controlling device 101 of the air-conditioning apparatus 100, 200 such that an air-conditioning apparatus 100, 200 having a refrigerant charge assisting function is provided.

What is claimed is:

1. A refrigerant charge assisting device used when a refrigerant is charged into a refrigerant circuit of an air-conditioning apparatus in which the refrigerant circuit is formed by one or more heat source units including a compressor and a heat source side heat exchanger and one or more use units including a use side pressure reduction mechanism and a use side heat exchanger, the one or more heat source units and the one or more use units being connected with a liquid side refrigerant extension pipe and a gas side refrigerant extension pipe, the refrigerant charge assisting device comprising:

an input unit that is input with an initial refrigerant charge amount;

an operation data acquisition unit that starts operation of the refrigerant circuit and acquires operation data of the refrigerant circuit after the initial refrigerant charge amount of refrigerant is charged in the refrigerant circuit;

a charge amount computing unit that computes an internal volume of the liquid side refrigerant extension pipe from the initial refrigerant charge amount input to the input unit and the operation data acquired by the operation data acquisition unit, a target refrigerant charge amount from the internal volume of the liquid side refrigerant extension pipe and a standard operating state acquired in advance, the standard operating state being operation data of the refrigerant circuit when the refrigerant circuit is in a standard operating state that satisfies a preset condition, and an additional refrigerant charge amount on a basis of the target refrigerant charge amount and the initial refrigerant charge amount; and a display unit that displays the additional refrigerant charge amount computed by the charge amount computing unit.

2. The refrigerant charge assisting device of claim 1, further comprising a determination unit that determines whether an operating state of the refrigerant circuit has become stable, wherein the operation of the refrigerant circuit started by the operation data acquisition unit is a refrigerant charge amount detection operation that turns a liquid reservoir provided in the refrigerant circuit into a state in which there is no refrigerant in the liquid reservoir by operating the refrigerant circuit such that a superheating is obtained in the use side heat exchanger the charge amount computing unit uses the operation data acquired after the operating state of the refrigerant circuit is determined to have become stable by the determination unit after start of the refrigerant charge amount detection operation, in order to compute the internal volume of the liquid side refrigerant extension pipe.

3. The refrigerant charge assisting device of claim 2, wherein further, in the refrigerant charge amount detection operation, the operating frequency of the compressor is controlled such that an evaporating temperature between the use side heat exchanger and the compressor is constant at a permissible minimum evaporating temperature.

4. The refrigerant charge assisting device of claim 3, wherein further, in the refrigerant charge amount detection operation, the opening degree of the use side pressure reduction mechanism is controlled and the superheat of the use side heat exchange is increased such that the evaporating temperature between the use side heat exchanger and the compressor is constant at a permissible minimum evaporating temperature.

5. The refrigerant charge assisting device of claim 2, wherein further, in the refrigerant charge amount detection operation, a rotation speed of a heat source side fan is controlled such that a temperature difference between a condensing temperature between the compressor and the use side pressure reduction mechanism and an outside air temperature is constant or is controlled such that the rotation speed is fixed in accordance with the outside air temperature.

6. The refrigerant charge assisting device of claim 2, wherein
the operation data acquisition unit sequentially acquires the operation data, and
the determination unit determines that the operating state has become stable when, on a basis of the sequentially acquired operation data, at least one of changes in a subcooling between the heat source side heat exchanger and the use side pressure reduction mechanism, a discharge temperature of the compressor, and the pressure between the compressor and the use side pressure reduction mechanism is determined to have become smaller than a predetermined value for discriminating whether the refrigerant is flowing out from the liquid reservoir.

7. The refrigerant charge assisting device of claim 1, wherein
the preset condition of the standard operation state is a temperature condition in which the heat source side fan that sends air to the heat source side heat exchanger is at a maximum available rotation speed.

8. The refrigerant charge assisting device of claim 1, wherein
in the display of the additional refrigerant charge amount when the additional refrigerant charge amount computed by the charge amount computing unit is a positive value and the ratio of the additional refrigerant charge amount to the target refrigerant charge amount is equivalent to or smaller than a predetermined percentage that discriminates whether there is to be any subcooling between the heat source side heat exchanger and the use side pressure reduction mechanism, the computed additional refrigerant charge amount is displayed as it is, and when the ratio of the additional refrigerant charge amount to the target refrigerant charge amount exceeds the predetermined percentage, a value that is equivalent to or smaller than the predetermined percentage and that is larger than zero percent of the target refrigerant charge amount is displayed, and
when the additional refrigerant charge amount computed by the charge amount computing unit is a negative value, the value is displayed as a overcharged amount.

9. The refrigerant charge assisting device of claim 8, wherein the predetermined percentage is 20%.

10. The refrigerant charge assisting device of claim 1, wherein
the charge amount computing unit computes the internal volume of the liquid side refrigerant extension pipe assuming that a refrigerant state between the heat source side heat exchanger and the use side pressure reduction mechanism is in a saturated liquid state when there is no subcooling between the heat source side heat exchanger and the use side pressure reduction mechanism.

11. The refrigerant charge assisting device of claim 1, wherein
the operation data acquisition unit acquires an upstream side temperature of the liquid side refrigerant extension pipe and a downstream side temperature of the liquid side refrigerant extension pipe, and
the charge amount computing unit uses the upstream side temperature and the downstream side temperature in computing the internal volume of the liquid side refrigerant extension pipe.

12. The refrigerant charge assisting device of claim 1, wherein
the heat source unit further includes a subcooling heat exchanger that exchanges heat between a high-pressure refrigerant that has passed through the heat source side heat exchanger and a low-pressure refrigerant that is a portion of the high-pressure refrigerant, which has been decompressed, and
the charge amount computing unit determines whether an outlet of the heat source side heat exchanger is in a liquid phase state or in a two-phase state from an operating state of the subcooling heat exchanger when there is a subcooling between the heat source side heat exchanger and the use side pressure reduction mechanism, computes a refrigerant density of the heat source side heat exchanger in accordance with a determination result of the charge amount computing unit, and uses the refrigerant density of the heat source side heat exchanger for computing the internal volume of the liquid side refrigerant extension pipe.

13. An air-conditioning apparatus comprising the refrigerant charge assisting device and the refrigerant circuit of claim 1.

14. A non-transitory information storage medium storing thereon a refrigerant charge assisting program for a refrigerant circuit of an air-conditioning apparatus in which the refrigerant circuit is formed by one or more heat source units including a compressor and a heat source side heat exchanger and one or more use units including a use side pressure reduction mechanism and a use side heat exchanger, the one or more heat source units and the one or more use units being connected with a liquid side refrigerant extension pipe and a gas side refrigerant extension pipe, that, when the refrigerant charge assisting program is executed by at least one computer, causes the at least one computer to:
start, by an operation data acquisition unit, operation of the refrigerant circuit of the air-conditioning apparatus and acquires operation data of the refrigerant circuit after the initial refrigerant charge amount of refrigerant is charged in the refrigerant circuit; and
compute, in a charge amount computing unit,
an internal volume of the liquid side refrigerant extension pipe from the initial refrigerant charge amount input to the input unit and the operation data acquired by the operation data acquisition unit,
a target refrigerant charge amount from the internal volume of the liquid side refrigerant extension pipe and a standard operating state acquired in advance, the standard operating state being operation data of the refrigerant circuit when the refrigerant circuit is in a standard operating state that satisfies a preset condition, and
an additional refrigerant charge amount on a basis of the target refrigerant charge amount and the initial refrigerant charge amount.

* * * * *